United States Patent
Sasaki

(10) Patent No.: US 10,546,185 B2
(45) Date of Patent: Jan. 28, 2020

(54) IMAGE PROCESSING APPARATUS FOR PERFORMING IMAGE PROCESSING ACCORDING TO PRIVACY LEVEL

(71) Applicant: CASIO COMPUTER CO., LTD., Shibuya-ku, Tokyo (JP)

(72) Inventor: Masaaki Sasaki, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/295,333

(22) Filed: Oct. 17, 2016

(65) Prior Publication Data

US 2017/0154207 A1   Jun. 1, 2017

(30) Foreign Application Priority Data

Dec. 1, 2015   (JP) ................................. 2015-234701
Jun. 15, 2016   (JP) ................................. 2016-118545

(51) Int. Cl.
*G06K 9/00* (2006.01)
*G06K 9/52* (2006.01)
*G06K 9/46* (2006.01)

(52) U.S. Cl.
CPC ....... *G06K 9/00288* (2013.01); *G06K 9/4652* (2013.01); *G06K 9/52* (2013.01)

(58) Field of Classification Search
CPC ........... G06K 9/00288; G06K 9/00234; G06K 9/4652; G06K 9/52; G06F 21/6245
See application file for complete search history.

(56) References Cited

U.S. PATENT DOCUMENTS

| 8,254,647 | B1* | 8/2012 | Nechyba | G06K 9/00248 382/118 |
| 9,036,875 | B2 | 5/2015 | Yuasa | |
| 9,521,329 | B2 | 12/2016 | Nonaka et al. | |
| 2008/0144891 | A1* | 6/2008 | Hwang | G06K 9/00268 382/118 |
| 2010/0014719 | A1* | 1/2010 | Date | G06F 17/30247 382/118 |
| 2011/0194732 | A1* | 8/2011 | Tsuji | G06K 9/00288 382/103 |

(Continued)

FOREIGN PATENT DOCUMENTS

| CN | 101140620 A | 3/2008 |
| CN | 104718742 A | 6/2015 |

(Continued)

OTHER PUBLICATIONS

Chinese Office Action (and English language translation thereof) dated Jun. 28, 2019 issued in Chinese Application No. 201610908844.5.

*Primary Examiner* — Ming Y Hon
(74) *Attorney, Agent, or Firm* — Holtz, Holtz & Volek PC

(57) ABSTRACT

An image processing apparatus includes: a first determination unit that determines whether or not a privacy level indicating a level of difficulty in identifying a person's face included in an image as a face of a specific person satisfies a predetermined condition; and an image capture control unit that performs control to execute a predetermined image-related process, in the case where the first determination unit determines that the privacy level satisfies the predetermined condition.

18 Claims, 14 Drawing Sheets

(56) References Cited

U.S. PATENT DOCUMENTS

| | | | | |
|---|---|---|---|---|
| 2012/0102431 A1* | 4/2012 | Krolczyk | .......... | G06F 17/30044 |
| | | | | 715/790 |
| 2013/0129159 A1* | 5/2013 | Huijgens | ............ | G06K 9/00973 |
| | | | | 382/118 |
| 2014/0037155 A1* | 2/2014 | Faria | ..................... | H04L 9/3231 |
| | | | | 382/118 |
| 2014/0219519 A1* | 8/2014 | Yuasa | ................ | G06K 9/00255 |
| | | | | 382/118 |
| 2015/0294649 A1* | 10/2015 | Imamura | .................. | G09G 5/36 |
| | | | | 345/641 |
| 2015/0355463 A1* | 12/2015 | Sako | .................... | G02B 27/017 |
| | | | | 345/633 |
| 2016/0086015 A1* | 3/2016 | Irmatov | ............. | G06K 9/00281 |
| | | | | 382/103 |
| 2016/0086018 A1* | 3/2016 | Lemoff | .............. | G06K 9/00295 |
| | | | | 382/118 |
| 2017/0091570 A1* | 3/2017 | Rao | .................... | G06K 9/00979 |
| 2017/0140211 A1* | 5/2017 | Hayasaka | .......... | G06K 9/00281 |
| 2017/0161906 A1* | 6/2017 | Davis | ................ | G06K 9/00288 |

FOREIGN PATENT DOCUMENTS

| | | | |
|---|---|---|---|
| JP | 2000322660 | A | 11/2000 |
| JP | 2010081428 | A | 4/2010 |
| JP | 2012100185 | A | 5/2012 |
| JP | 2014082695 | A | 5/2014 |

* cited by examiner

LOW ←——————— PRIVACY LEVEL ———————→ HIGH

LOW ←——————— PRIVACY LEVEL ———————→ HIGH

FIG. 9A
CONCEALMENT TABLE ST
| CONCEALMENT TYPE | PRIVACY LEVEL |
|---|---|
| SUNGLASSES (EYES NOT DETECTABLE THROUGH LENSES OF CONCEALMENT) | 6 (HIGH) |
| FALSE BEARD | 5 |
| EYE BANDAGE, EYEPATCH | 4 |
| GLASSES (EYES DETECTABLE THROUGH LENSES OF CONCEALMENT) | 3 |
| MOUTH MASK | 2 |
| NOSE MASK | 1 (LOW) |
FIG. 9B
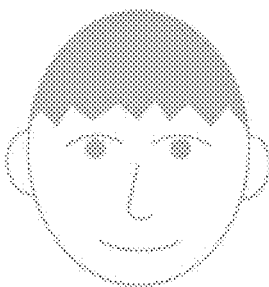 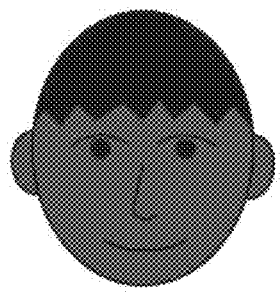 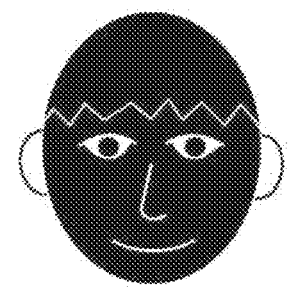
WHITE DUE TO BLOWN-OUT HIGHLIGHTS    BLACK AGAINST LIGHT    BLACK WITH MAKEUP
PRIVACY LEVEL
LOW ← → HIGH

IMAGE PROCESSING APPARATUS FOR PERFORMING IMAGE PROCESSING ACCORDING TO PRIVACY LEVEL

CROSS-REFERENCE TO RELATED APPLICATIONS

This application is based upon and claims the benefit of priority from Japanese Patent Applications No. 2015-234701 filed Dec. 1, 2015 and No. 2016-118545 filed Jun. 15, 2016, the entire contents of which are incorporated herein by reference.

BACKGROUND OF THE INVENTION

1. Field of the Invention

The present invention relates to an image processing apparatus and an image processing method.

2. Description of the Related Art

There have conventionally been desires to release or record an image that shows a person in the state where the person is difficult to be identified by others who see the image. Techniques of pixelizing or masking a person's face for privacy protection have been known as described in, for example, Japanese Patent Application Laid-Open No. 2000-322660.

SUMMARY OF THE INVENTION

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The accompanying drawings, together with the detailed description given below, serve to provide a greater understanding of the present application.

FIG. 9A is a diagram for describing the privacy level calculation process.

FIG. 9B is a diagram for describing the privacy level calculation process.

DETAILED DESCRIPTION OF THE PREFERRED EMBODIMENTS

Specific embodiments of the present invention are described below, with reference to drawings. Note that the scope of the present invention is not limited to the illustrated examples.

Embodiment 1

Figure 1:
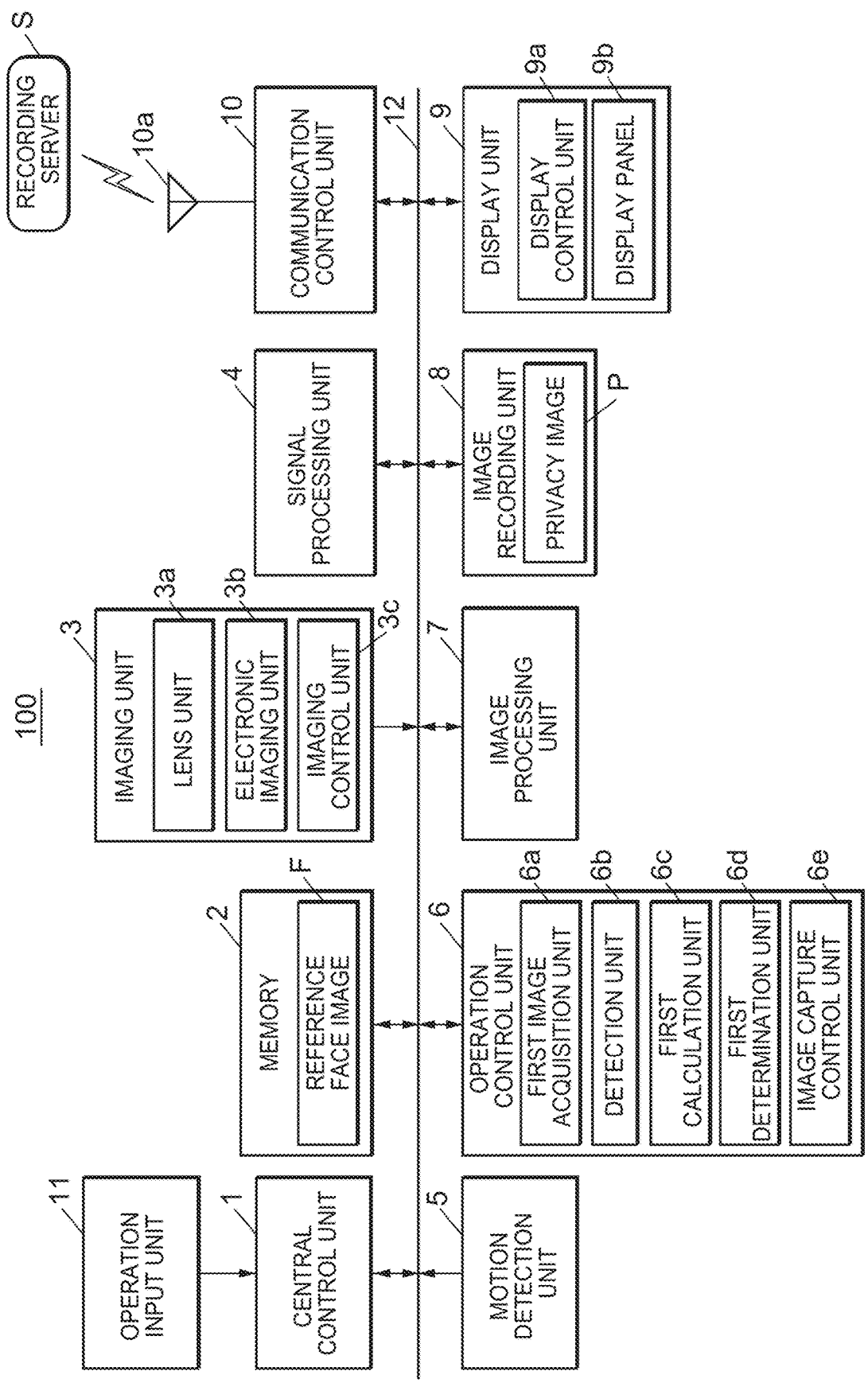
FIG. 1 is a block diagram illustrating the schematic structure of an image processing apparatus in Embodiment 1 to which the present invention is applied.

FIG. 1 is a block diagram illustrating the schematic structure of an image processing apparatus 100 in Embodiment 1 to which the present invention is applied.

As illustrated in FIG. 1, the image processing apparatus 100 in Embodiment 1 includes a central control unit 1, a memory 2, an imaging unit 3, a signal processing unit 4, a motion detection unit 5, an operation control unit 6, an image processing unit 7, an image recording unit 8, a display unit 9, a communication control unit 10, and an operation input unit 11.

The central control unit 1, the memory 2, the imaging unit 3, the signal processing unit 4, the motion detection unit 5, the operation control unit 6, the image processing unit 7, the image recording unit 8, the display unit 9, and the communication control unit 10 are connected to each other via a bus line 12.

For example, the image processing apparatus 100 may be a mobile station used in a mobile communication network such as a mobile phone or a smartphone or a communication terminal such as a personal data assistant (PDA) having an imaging function, or a digital camera or the like having a communication function.

The central control unit 1 controls each unit in the image processing apparatus 100. In detail, the central control unit 1 includes a central processing unit (CPU) and the like (not illustrated), and performs various control operations according to various processing programs (not illustrated) for the image processing apparatus 100.

The memory 2 includes, for example, dynamic random access memory (DRAM), and temporarily stores data processed by the central control unit 1, the operation control unit 6, etc. For example, the memory 2 temporarily stores a reference face image F (described in detail later) captured in an automatic imaging process.

The imaging unit (imaging means) 3 images a predetermined subject (e.g. a person) and generates a frame image. In detail, the imaging unit 3 includes a lens unit 3a, an electronic imaging unit 3b, and an imaging control unit 3c.

The lens unit 3a includes, for example, a plurality of lenses such as a zoom lens and a focus lens, a diaphragm for adjusting the amount of light passing through each lens, etc. The lens unit 3a is exposed on the same side as a display panel 9b (the subject side) to enable taking selfies (self-portrait photographs).

The electronic imaging unit 3b includes, for example, an image sensor (imaging device) such as a charge coupled device (CCD) or a complementary metal-oxide semiconductor (CMOS). The electronic imaging unit 3b converts an optical image which has passed through the lenses in the lens unit 3a, into a two-dimensional image signal.

The imaging control unit 3c scans and drives the electronic imaging unit 3b by a timing generator, a driver, and the like so that the electronic imaging unit 3b converts the optical image which has passed through the lens unit 3a into a two-dimensional image signal with predetermined periodicity, and reads each frame image from the imaging area in the electronic imaging unit 3b and outputs it to the signal processing unit 4.

The signal processing unit 4 performs each type of image signal processing on the analog signal of the frame image transferred from the electronic imaging unit 3b. For example, the signal processing unit 4 performs gain adjustment on the analog signal of the frame image for each color component of RGB, samples and holds the gain-adjusted analog signal in a sample and hold circuit (not illustrated) and converts it into digital data in an A/D converter (not illustrated), and performs color processing including pixel interpolation and gamma correction on the digital data in a color processing circuit (not illustrated), to generate a digital luminance signal Y and color difference signals Cb and Cr (YUV data). The signal processing unit 4 outputs the generated luminance signal Y and color difference signals Cb and Cr to the memory 2 used as buffer memory.

The motion detection unit 5 detects the motion of the image processing apparatus 100.

For example, the motion detection unit 5 includes a triaxial angular velocity sensor for detecting the angular velocity of rotation about each of the three axes (roll axis, pitch axis, and yaw axis) orthogonal to each other in the image processing apparatus 100. The motion detection unit 5 outputs the signals sequentially detected by the triaxial angular velocity sensor to the operation control unit 6 as motion information, for example when capturing the image of the subject.

The operation control unit 6 includes a first image acquisition unit 6a, a detection unit 6b, a first calculation unit 6c, a first determination unit 6d, and an image capture control unit 6e.

For example, each unit in the operation control unit 6 is composed of a predetermined logic circuit. This structure, however, is an example and does not limit the present invention.

The first image acquisition unit 6a acquires each of the frame images sequentially captured by the imaging unit 3.

In detail, the first image acquisition unit 6a acquires, from the memory 2, the image data of each of the frame images of the live view image sequentially captured by the imaging unit 3 and generated by the signal processing unit 4.

The detection unit 6b detects a face, a part (or parts) of the face, and the line of sight from each frame image acquired by the first image acquisition unit 6a.

In detail, the detection unit 6b performs a face detection process to detect a face region including the face of the person as the subject, for each of the frame images sequentially captured by the imaging unit 3 and acquired by the first image acquisition unit 6a. The detection unit 6b further detects one or more face parts such as the eyes and the mouth, from the face region detected in the face detection process. The detection unit 6b also performs a line of sight detection process to detect the line of sight of the person as the subject, for each of the frame images sequentially captured by the imaging unit 3 and acquired by the first image acquisition unit 6a.

In addition, the detection unit 6b detects the whole body of the person as the subject and specifies the shape, for each of the frame images sequentially captured by the imaging unit 3 and acquired by the first image acquisition unit 6a. Whether the person is out of the frame image or within the frame image and whether or not the person has turned his or her body can be determined from the change of the specified shape of the person.

The above-mentioned face detection process, part detection process, line of sight detection process, and person's shape specifying process are well-known techniques, and so their detailed description is omitted here. For example, the face detection process and the part detection process may use an active appearance model (AAM), and the line of sight detection process may detect the position of each eye and, from the area ratio of the white portions on both sides of the iris of the eye, detect the line of sight.

The first calculation unit (calculation means) 6c calculates a privacy level.

The privacy level mentioned here indicates the level of difficulty in identifying a person's face included in an image (such as a frame image) as the face of a specific person. An image in which the specific person's face is easy to be identified is relatively low in privacy level, whereas an image in which the specific person's face is difficult to be identified is relatively high in privacy level. In detail, the privacy level varies depending on the state (angle, size, whether hidden or not, color, etc.) of the person's face or face part (eyes, mouth, etc.) in the image, and the state of any external concealment (sunglasses, mask, etc.) that hides the person's face or face part.

Here, the state where the person's face in the frame image is identifiable as the face of the specific person, such as the state where the person's face is detectable and the person's face and line of sight are frontward (predetermined direction), is set as a reference state. The privacy level then varies based on the relative change of the person's whole face or face part, the change of the ratio at which the person's face or face part is hidden, the change of the size of the person's face in the frame image or the imaging distance to the person's face, the change of the external concealment that hides the person's face or face part, the change of the color of the person's face, and the like from the reference state.

Figure 6:
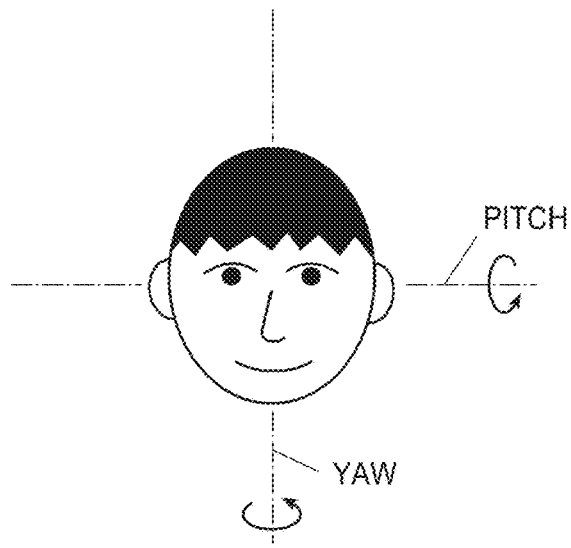
FIG. 6 is a diagram for describing the privacy level calculation process.

The relative change of the person's whole face or face part may result from, for example, the action of the person as the subject turning the face about a predetermined axis (e.g. the yaw axis or the pitch axis, see FIG. 6), the action of the person turning the whole body about the yaw axis to turn the face about the yaw axis, the action of the person moving the line of sight away from the front, or the action of changing the position of the image processing apparatus 100 up or down or right or left so that the optical axis direction of the lens unit 3a of the image processing apparatus 100 is oblique to the front of the person's face. Here, the action of the person turning the face about the roll axis and the action of turning the image processing apparatus 100 about the optical axis of the lens unit 3a are excluded because they have little influence on the face detection process. However, these actions may also be included to set finer privacy levels of images.

The change of the ratio at which the person's face or face part is hidden may result from, for example, the action of the person as the subject hiding the whole face or at least one face part (eyes, mouth, etc.) by his or her hand or hair, an external concealment (sunglasses, mask, etc.), or the like.

The change of the size of the person's face in the frame image or the imaging distance to the person's face may result from, for example, the action of adjusting the physical distance between the person as the subject and the image processing apparatus 100, the action of adjusting the zoom factor (focal length) of the imaging unit 3, or the action of designating an area to which the captured image is to be trimmed.

The change of any external concealment that hides the person's face or face part may result from, for example, the difference of the type of external concealment hiding the eye or eyes such as glasses, sunglasses, an eye bandage, or an eyepatch. Regarding masks, too, the change may result from the difference of the face part to be hidden as in the case of a mouth mask and a nose mask.

The change of the color of the person's face may result from the face being black against the light or being white due to blown-out highlights depending on the light applied to the person as the subject or the exposure state of the image processing apparatus 100, or the face being painted in a color different from skin color for makeup or the like.

In detail, the first calculation unit 6c specifies, as the reference state, the state where the person's face is detectable and the person's face and line of sight are frontward (predetermined direction), based on the result of detection by the detection unit 6b on each of the frame images sequentially captured by the imaging unit 3 and acquired by the first image acquisition unit 6a. The first calculation unit 6c detects, with respect to the frame image in the reference state (reference face image F), the relative change of the person's whole face or face part, the change of the ratio at which the person's face or face part is hidden, the change of the size of the person's face in the frame image or the imaging distance to the person's face, the change of the external concealment that hides the person's face or face part, and/or the change of the color of the person's face, and calculates the privacy level.

As an example, the first calculation unit 6c compares the face detection frame shape corresponding to the face region of the person in the reference face image F and the face detection frame shape corresponding to the face region of the person in the frame image acquired by the first image acquisition unit 6a, and specifies the change of the turning angle of the face of the person as the subject about the predetermined axis (e.g. the yaw axis or the pitch axis) with respect to the reference state. When the person's face turns about the yaw axis, the face detection frame has a vertically long rectangular shape. When the person's face turns about the pitch axis, the face detection frame has a horizontally long rectangular shape. The first calculation unit 6c calculates, for example, the turning central axis and turning angle of the person's face from the change of the face detection frame shape, and specifies the change quantity or change rate of the turning angle of the person's face about the predetermined axis with respect to the reference state. Even in the case where the person turns the whole body approximately 180° about the yaw axis, i.e. the person turns the whole body so as to face rearward, the detection unit 6b detects the turn of the person's whole body, and so the first calculation unit 6c can specify the change of the turning angle from the detection result. The first calculation unit 6c may calculate the turning angle of the image processing apparatus 100 based on the motion information output from the motion detection unit 5, and specify the change quantity or change rate of the optical axis direction of the lens unit 3a of the image processing apparatus 100 relative to the front of the person's face with respect to the reference state.

As another example, the first calculation unit 6c compares the person's line of sight in the reference face image F and the person's line of sight in the frame image acquired by the first image acquisition unit 6a, and specifies the change of the line of sight of the person as the subject with respect to the reference state.

Figure 7A:
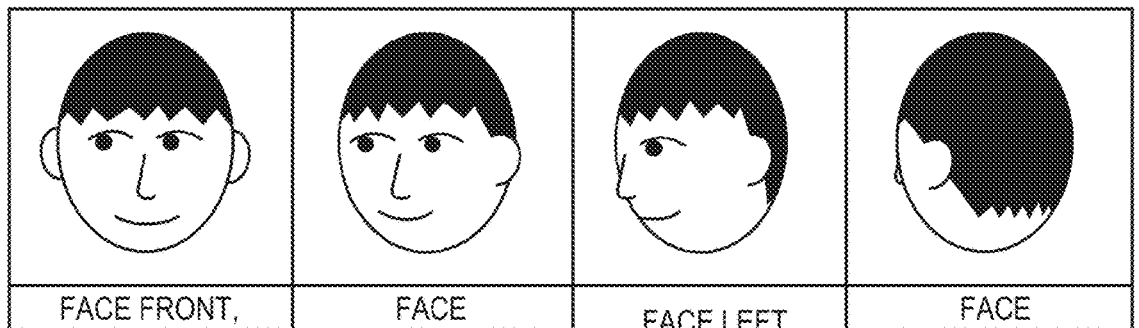
FIG. 7A is a diagram for describing the privacy level calculation process.
Figure 7B:
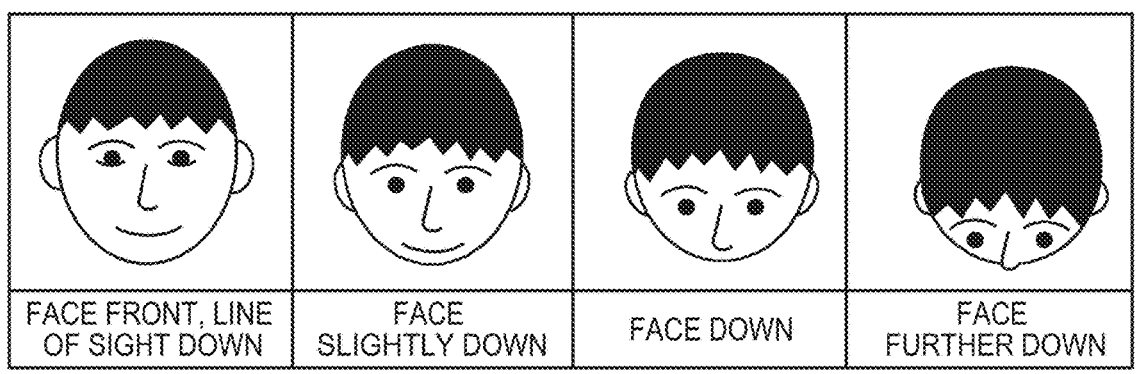
FIG. 7B is a diagram for describing the privacy level calculation process.
Figure 7C:
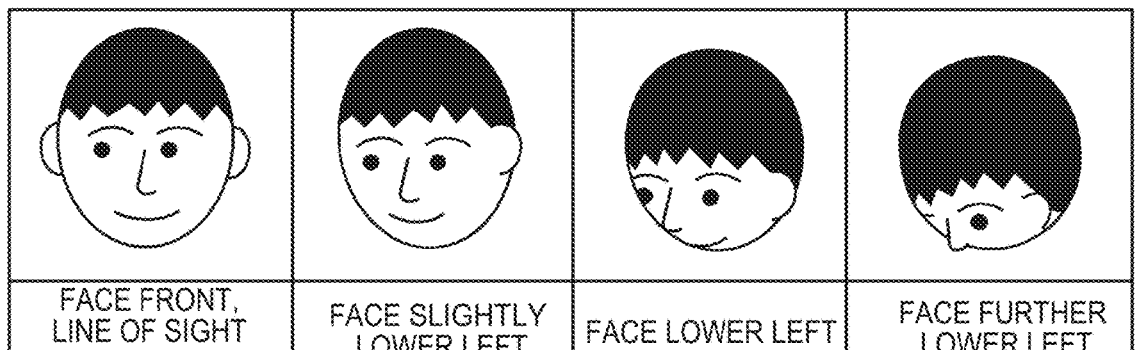
FIG. 7C is a diagram for describing the privacy level calculation process.

The first calculation unit 6c then calculates the privacy level based on the specified change quantity or change rate of the turning angle of the person's face about the predetermined axis with respect to the reference state, change quantity or change rate of the optical axis direction of the lens unit 3a of the image processing apparatus 100 relative to the front of the person's face with respect to the reference state, and/or change of the line of sight of the person as the subject with respect to the reference state. For example, in the case where the person's face turns right or left about the yaw axis or the person's line of sight moves right or left, the first calculation unit 6c calculates the privacy level based on such a correlation in which the privacy level is lowest in the state where the face is frontward and only the line of sight is leftward (or rightward) and increases as the face turns left (or right), as illustrated in FIG. 7A. In the case where the person's face turns up or down about the pitch axis or the person's line of sight moves up or down, the first calculation unit 6c calculates the privacy level based on such a correlation in which the privacy level is lowest in the state where the face is frontward and only the line of sight is downward (or upward) and increases as the face turns down (or up), as illustrated in FIG. 7B. In the case where the person's face turns right or left about the yaw axis and up or down about the pitch axis or the person's line of sight moves right or left and up or down, the first calculation unit 6c calculates the privacy level based on such a correlation in which the privacy level is lowest in the state where the face is frontward and only the line of sight is lower leftward (or lower rightward, upper leftward, or upper rightward) and increases as the face turns lower left (or lower right, upper left, or upper right), as illustrated in FIG. 7C.

Alternatively, the first calculation unit 6c may set the privacy level for the person's line of sight and the turning angle of the face about the predetermined axis, not based on the correlation but separately.

The above-mentioned method of specifying the change of the turning angle of the person's face about the predetermined axis is an example and does not limit the present invention. For instance, a plurality of discriminators corresponding to different turning angles of the face may be used in the face detection process, where the first calculation unit 6c determines which discriminator has detected the turning angle. The above-mentioned method of specifying the change of the line of sight is an example and does not limit the present invention, and the method may be changed as appropriate.

As another example, the first calculation unit 6c compares the number of face parts detected from the reference face image F and the number of face parts detected from the frame image acquired by the first image acquisition unit 6a, and specifies the change of the ratio at which the person's face part is hidden with respect to the reference state. In detail, the first calculation unit 6c specifies the change of the ratio at which the person's face part is hidden with respect to the reference state, from the change of the number of face parts such as the eyes and the mouth detected from the face region in the face detection process.

Figure 8A:
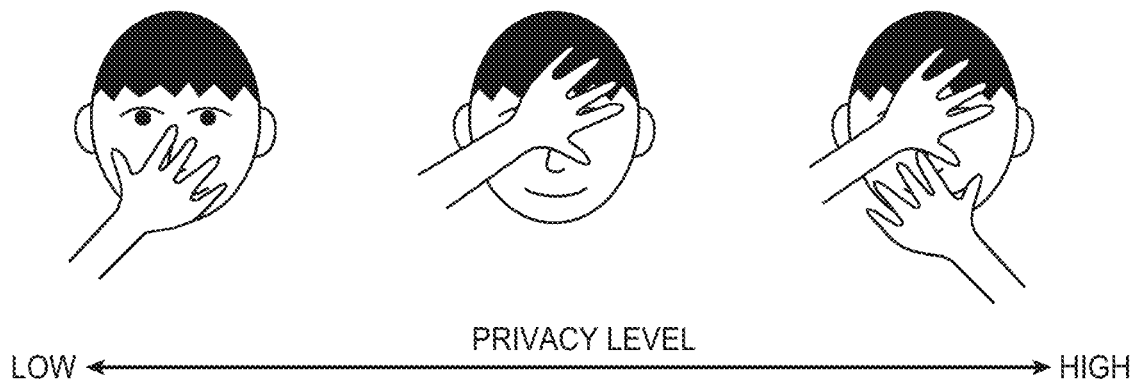
FIG. 8A is a diagram for describing the privacy level calculation process.

The first calculation unit 6c then calculates the privacy level based on the specified change of the ratio at which the person's face part is hidden with respect to the reference state. For example, the first calculation unit 6c calculates the privacy level based on such a correlation in which the privacy level is lowest in the state where one of the face parts (e.g. mouth) is hidden and increases as the number of hidden face parts increases, as illustrated in FIG. 8A.

The above-mentioned method of specifying the change of the ratio at which the person's face part is hidden is an example and does not limit the present invention, and the method may be changed as appropriate.

As another example, the first calculation unit 6c compares the number of pixels constituting the person's face in the reference face image F and the number of pixels constituting the person's face in the frame image acquired by the first image acquisition unit 6a, and specifies the change of the size of the person's face in the frame image with respect to the reference state. For instance, when the physical distance between the person and the image processing apparatus 100 is greater, the number of pixels constituting the person's face in the frame image is smaller. The first calculation unit 6c specifies the change of the size of the person's face in the frame image with respect to the reference state, for example from the change of the number of pixels constituting the face region that contains the person's face. The first calculation unit 6c may convert the focal length of the imaging unit 3 or the like into the imaging distance to the person's face (subject distance), and specify the change of the size of the person's face in the frame image with respect to the reference state from the change of the imaging distance.

Figure 8B:
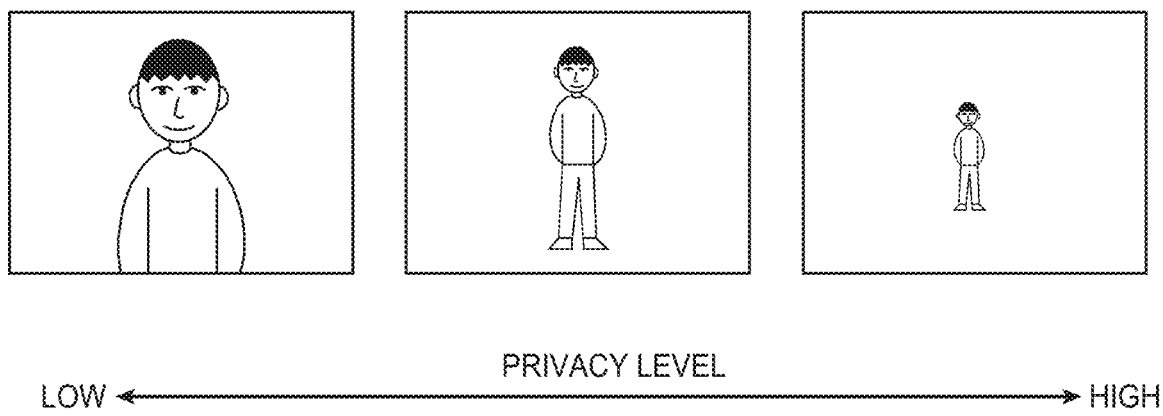
FIG. 8B is a diagram for describing the privacy level calculation process.

The first calculation unit 6c then calculates the privacy level based on the specified change of the size of the person's face in the frame image with respect to the reference state. For example, the first calculation unit 6c calculates the privacy level based on such a correlation in which the privacy level is lower when the size of the person's face in the frame image is larger and increases as the face size decreases, as illustrated in FIG. 8B.

The above-mentioned method of specifying the change of the size of the person's face is an example and does not limit the present invention, and the method may be changed as appropriate.

As another example, the first calculation unit 6c compares the type of external concealment detected from the reference face image F and the type of external concealment detected from the frame image acquired by the first image acquisition unit 6a, and specifies the change of the external concealment with respect to the reference state. For example, the first calculation unit 6c learns a large number of face images with sunglasses and a large number of face images with masks from the face regions detected in the face detection process. Based on the learned data, the first calculation unit 6c detects an external concealment such as sunglasses or a mask from the face region, and specifies the change of the external concealment with respect to the reference state from the change of the detected type of external concealment.

The first calculation unit 6c then calculates the privacy level based on the specified change of the external concealment with respect to the reference state. For example, the first calculation unit 6c calculates the privacy level depending on the type of external concealment, with reference to a concealment table ST illustrated in FIG. 9A. The concealment table ST stores the external concealment types and the privacy levels in association with each other.

The above-mentioned method of specifying the change of the external concealment is an example and does not limit the present invention, and the method may be changed as appropriate. For instance, a known object recognition technique may be used to recognize an object different from any face part and detect the object as an external concealment.

The above-mentioned types of external concealment to be detected are an example and do not limit the present invention. For instance, a hat or bandana covering the head may be detected.

Moreover, a higher privacy level may be calculated in the case where a plurality of external concealments are detected.

As another example, the first calculation unit 6c compares the color of the person's face detected from the reference face image F and the color of the person's face detected from the frame image acquired by the first image acquisition unit 6a, and specifies the change of the color of the person's face with respect to the reference state. In detail, the first calculation unit 6c measures, from the face region detected in the face detection process, the average value of each of R, G, and B of the skin color region except the parts such as the eyes and the mouth whose colors differ from the skin color, and sums the respective absolute differences between the R, G, and B values of the person's face detected from the reference face image F and the R, G, and B values of the person's face detected from the frame image acquired by the first image acquisition unit 6a, thus specifying the change of the color of the person's face.

The first calculation unit 6c then calculates the privacy level based on the specified change of the color of the person's face with respect to the reference state. For example, the first calculation unit 6c calculates the privacy level based on such a correlation in which the privacy level is lower when the difference between the color of the person's face detected from the reference face image F and the color of the person's face in the frame image is smaller and increases as the difference increases, as illustrated in FIG. 9B.

The above-mentioned method of specifying the change of the color of the person's face is an example and does not limit the present invention, and the method may be changed as appropriate. For instance, the first calculation unit 6c may measure the area ratio of the region whose color differs by a predetermined value or more from the average value of each of R, G, and B of the color of the person's face detected from the reference face image F, and calculate the privacy level depending on the area ratio.

The first calculation unit 6c calculates the privacy level for each of the frame images of the live view image sequentially captured by the imaging unit 3 and acquired by the first image acquisition unit 6a in the automatic imaging process, and outputs the calculated privacy level to the first determination unit 6d.

The first calculation unit 6c may calculate the privacy level based on at least one of the above-mentioned relative change of the person's whole face or face part, change of the ratio at which the person's face or face part is hidden, change of the size of the person's face in the frame image or the imaging distance to the person's face, change of the external concealment, and change of the color of the person's face from the reference state. In the case of using more than one of these items, the first calculation unit 6c may evaluate each item individually, and calculate the privacy level by a comprehensive evaluation of these individual evaluation results.

The privacy level is calculated on condition that the person's body is within the frame image. If the person's body is not within the frame image, the privacy level calculation and the automatic imaging process are omitted.

The first determination unit (determination means) 6d determines whether or not the privacy level calculated by the first calculation unit 6c is higher than a predetermined determination value.

The first determination unit 6d determines whether or not the privacy level calculated by the first calculation unit 6c is higher than the determination value (i.e. satisfies a predetermined condition), for each of the live view images sequentially captured by the imaging unit 3 in the automatic imaging process. In detail, the first determination unit 6d first acquires a desired privacy level designated by the user and stored in the memory 2 beforehand, from the memory 2 as the determination value. The first determination unit 6d then acquires the privacy level calculated by the first calculation unit 6c, and determines whether or not the acquired privacy level is higher than the determination value.

As the determination value, for example, a value empirically obtained from a plurality of privacy levels calculated in the privacy level calculation process may be set as the default beforehand.

The image capture control unit (control means) 6e controls the imaging unit 3 to execute a predetermined image-related process.

In detail, the image capture control unit 6e controls the imaging unit 3 to capture a recording image, in the case where the first determination unit 6d determines that the privacy level is higher than the predetermined determination value. For example, the image capture control unit 6e outputs a recording image capture instruction to the imaging unit 3 to cause the imaging unit 3 to capture a recording image, when the determination result by the first determination unit 6d changes from the state where the privacy level calculated by the first calculation unit 6c is not higher than the determination value to the state where the privacy level is higher than the determination value in the automatic imaging process.

Alternatively, the image capture control unit 6e may cause the imaging unit 3 to capture a recording image when the determination result by the first determination unit 6d changes from the state where the privacy level calculated by the first calculation unit 6c is higher than the determination value to the state where the privacy level is not higher than the determination value. For example in the case where the privacy level of the live view image becomes too high, the user may perform such an action that lowers the privacy level of the image (e.g. the action of turning the face so that it is more frontward), in order to decrease the privacy level. In such a process, the image capture control unit 6e may cause the imaging unit 3 to capture a recording image based on the determination result by the first determination unit 6d.

The image capture control unit 6e also controls the imaging unit 3 to capture a recording image, in response to an imaging instruction operation by the user. For example, the image capture control unit 6e outputs a recording image capture instruction to the imaging unit 3 to cause the imaging unit 3 to capture a recording image, when the user performs an imaging instruction operation via the below-mentioned operation input unit 11 in a manual imaging process.

The image processing unit 7 encodes image data of a still image generated by the signal processing unit 4 in a predetermined compression format (e.g. JPEG), to generate recording image data for the still image.

The image processing unit 7 also decodes image data of a still image read from the memory 2 or the image recording unit 8 for display in the corresponding predetermined coding format, and outputs the decoded image data to the display unit 9. Here, the image processing unit 7 may modify the image data to a predetermined size (e.g. VGA or full HD) based on the display resolution of the display panel 9b or the like, and output the modified image data to the display unit 9.

The image recording unit 8 includes, for example, non-volatile memory (flash memory), and records the recording image data of the still image encoded in the predetermined compression format by the image processing unit 7. In detail, in each of the automatic imaging process and the manual imaging process, the image recording unit (recording means) 8 acquires the recording image captured by the image capture control unit 6e as a privacy image P and also acquires the privacy level calculated in the privacy level calculation process before capturing the privacy image P, and records the image data of the privacy image P in association with the privacy level as Exif (Exchangeable Image File Format) information.

Alternatively, the image recording unit 8 may have a removable recording medium (not illustrated), and control reading or writing of data from or to the attached recording medium.

The display unit 9 includes a display control unit 9a and the display panel 9b.

The display control unit 9a performs control to, based on image data of a predetermined size read from the memory 2 or the image recording unit 8 and decoded by the image processing unit 7, display a predetermined image in the display region of the display panel 9b. In detail, the display control unit 9a includes video random access memory (VRAM), a VRAM controller, and a digital video encoder. The digital video encoder reads a luminance signal Y and color difference signals Cb and Cr decoded by the image processing unit 7 and stored in the VRAM (not illustrated) from the VRAM via the VRAM controller at a predetermined reproduction framerate, generates a video signal based on the read data, and outputs the video signal to the display panel 9b.

The display panel 9b displays, for example, the image captured by the imaging unit 3 in the display region, based on the video signal from the display control unit 9a. In detail, the display panel 9b displays the live view image by sequentially updating, at a predetermined framerate, the plurality of frame images generated as a result of the imaging unit 3 capturing the image of the subject, in a still image capture mode.

Figure 10:
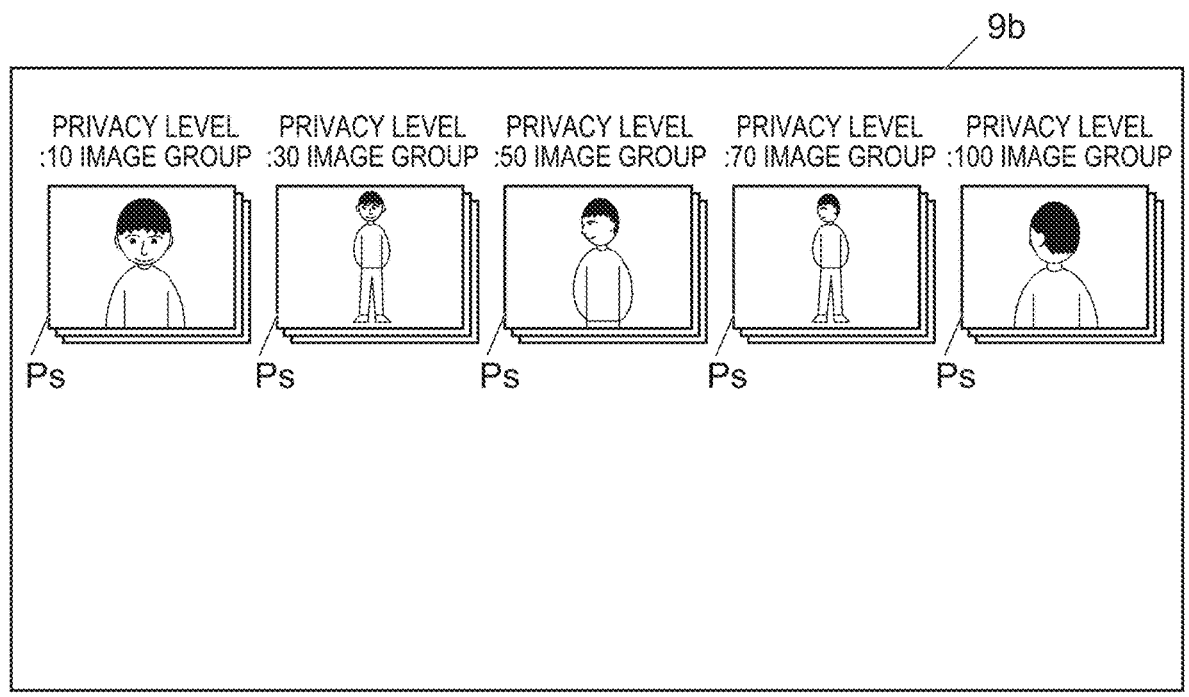
FIG. 10 is a diagram schematically illustrating an example of the mode of image display by the image processing apparatus in FIG. 1.

The display panel 9b also displays the image recorded in the image recording unit 8, in an image reproduction mode. Here, the display control unit 9a as display control means causes the display panel 9b to display each privacy image P recorded in the image recording unit 8 according to the classification or order based on the associated privacy level (see FIG. 10). For example, the display control unit 9a classifies the plurality of privacy images P recorded in the image recording unit 8 into image groups corresponding to predetermined privacy levels (e.g. 10, 30, 50, 70, 100), and causes the display panel 9b to display each classified image group, as illustrated in FIG. 10. Here, for each image group classified by privacy level, any one privacy image P may be thumbnail-displayed as a representative image Ps.

Alternatively, the display control unit 9a may rearrange the plurality of privacy images P recorded in the image recording unit 8 according to the associated privacy level, and cause the display panel 9b to display the privacy images P in that order.

The display panel 9b may be a liquid crystal display panel or an organic electroluminescence (EL) display panel. This, however, is an example and does not limit the present invention.

The communication control unit 10 performs data transmission and reception via a communication antenna 10a and a communication network (not illustrated).

The communication antenna 10a is an antenna capable of data transmission and reception in compliance with a predetermined communication standard (e.g. Wideband Code Division Multiple Access (W-CDMA), CDMA2000, or Global System for Mobile Communications (GSM™)) adopted by the image processing apparatus 100 for communication with a wireless base station (not illustrated). According to the communication protocol corresponding to the predetermined communication standard, the communication control unit 10 performs data transmission and reception with the wireless base station via the communication antenna 10a using a communication channel set in the communication standard. In detail, the communication control unit (transmission means) 10 transmits the privacy image P captured by the image capture control unit 6e to an external recording server (predetermined external apparatus) S via the communication antenna 10a.

The recording server S is, for example, a cloud server, and has a function of establishing a webpage (e.g. image release page) on the Internet as a Web (World Wide Web) server. For example, the recording server S receives various images from a communication terminal such as the image processing apparatus 100, and releases the images on the webpage as content.

Thus, the content released on the webpage established by the recording server S is viewable by the users of communication terminals that can access the webpage via the communication network.

The recording server S may have any structure as long as it includes a computer connectable to the communication network, and its detailed description is omitted here.

The communication network is, for example, a communication network for connecting the image processing apparatus 100 to any external apparatus such as the recording server S via a wireless base station, a gateway server (not illustrated), etc. The communication network is formed using a dedicated line or an existing general public line, and may be in any of various line forms such as a wide area network (WAN) or a local area network (LAN).

The communication network includes, for example, any of various types of communication networks such as a telephone line network, an ISDN line network, a dedicated line, a mobile communication network, a communication satellite line, and a CATV line network, an IP network, a Voice over Internet Protocol (VoIP) gateway, an Internet service provider, etc.

The above-mentioned structure of the communication control unit 10 is an example and does not limit the present invention, and the structure may be changed as appropriate. For instance, the communication control unit 10 may include a wireless LAN module and access the communication network via an access point, although not illustrated.

The operation input unit 11 is used to perform predetermined operations on the image processing apparatus 100. In detail, the operation input unit 11 includes an operation unit such as a shutter button for a subject imaging instruction, a selection button for a selection instruction regarding imaging modes, functions, etc., and a zoom button for a zoom adjustment instruction (not illustrated), and outputs a predetermined operation signal to the central control unit 1 in response to the operation of any button in the operation unit.

<Automatic Imaging Process>

Figure 2:
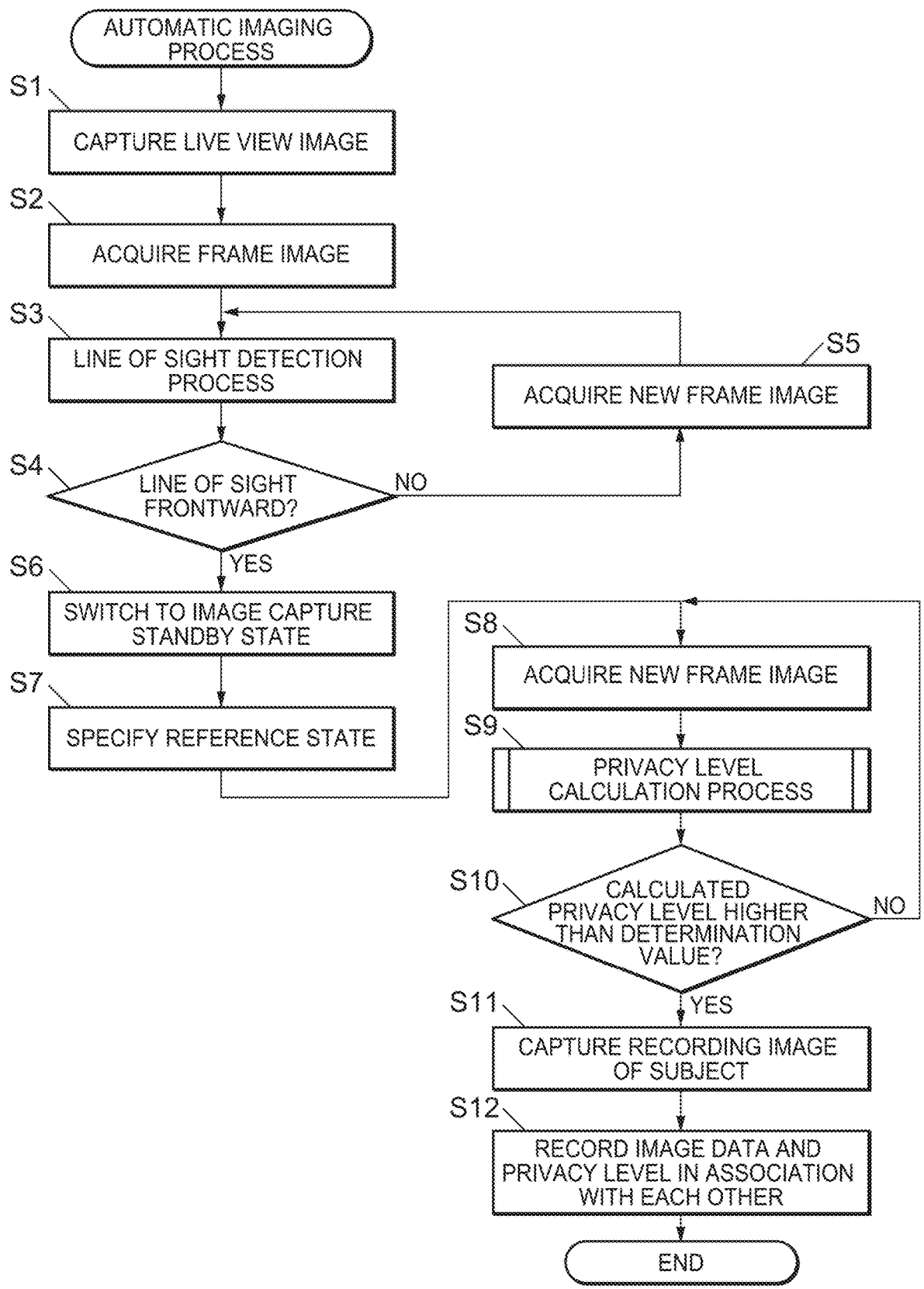
FIG. 2 is a flowchart illustrating an example of the operation relating to an automatic imaging process by the image processing apparatus in FIG. 1.

The following describes the automatic imaging process by the image processing apparatus 100, with reference to FIG. 2.

FIG. 2 is a flowchart illustrating an example of the operation relating to the automatic imaging process.

As illustrated in FIG. 2, when the imaging unit 3 starts capturing the live view image of the subject, the signal processing unit 4 performs each type of image signal processing on the analog signal of each frame image of the live view image transferred from the electronic imaging unit 3b, to generate digital image data (step S1). The signal processing unit 4 outputs the generated image data to the memory 2, and the memory 2 temporarily stores the received image data.

The first image acquisition unit 6a in the operation control unit 6 reads and acquires image data of a frame image of the live view image from the memory 2 (step S2).

The detection unit 6b performs the line of sight detection process on the frame image acquired by the first image acquisition unit 6a for processing (step S3), and determines whether or not the line of sight of the person as the subject is frontward (step S4).

In the case where the detection unit 6b determines that the line of sight is not frontward (step S4: NO), the first image acquisition unit 6a reads and acquires image data of a new frame image of the live view image from the memory 2 (step S5). The process then returns to step S3. In step S3, the detection unit 6b performs the line of sight detection process on the new frame image acquired by the first image acquisition unit 6a substantially in the same manner as above (step S3).

In the case where the detection unit 6b determines that the line of sight is frontward in step S4 (step S4: YES), the operation control unit 6 switches to the automatic imaging standby state (step S6).

In other words, the image processing apparatus 100 does not enter the automatic imaging standby state unless the line of sight of the person as the subject is frontward (the person is looking at the camera). This prevents, for example, automatic imaging against the person's intention in the state where the person is not looking at the camera.

After this, the detection unit 6b performs the detection process on each of the frame images sequentially acquired by the first image acquisition unit 6a. Based on the detection result by the detection unit 6b, the first calculation unit 6c specifies the state where the person's face is detectable and the person's line of sight is frontward (predetermined direction), as the reference state (step S7). The first calculation unit 6c outputs the frame image in the reference state to the memory 2, to temporarily store the frame image as the reference face image F. This temporarily stored reference face image F shows the person facing frontward (predetermined direction).

Next, the first image acquisition unit 6a reads and acquires image data of a new frame image of the live view image from the memory 2 (step S8). The operation control unit 6 performs the privacy level calculation process (see FIGS. 3 and 4) for calculating the privacy level of the new frame image (step S9, described in detail later).

The first determination unit 6d in the operation control unit 6 determines whether or not the privacy level calculated in the privacy level calculation process in step S9 is higher than the determination value set in the determination value setting process (step S10). In detail, the first determination unit 6d reads and acquires the determination value from the memory 2, and determines whether or not the privacy level calculated in the privacy level calculation process is higher than the determination value.

In the case where the first determination unit 6d determines that the privacy level is not higher than the determination value (step S10: NO), the process returns to step S8, and the operation control unit 6 performs the subsequent processes. In detail, the first image acquisition unit 6a acquires image data of a new frame image in step S8, and the operation control unit 6 performs the privacy level calculation process in step S9.

In the case where the first determination unit 6d determines that the privacy level is higher than the determination value (step S10: YES), the image capture control unit 6e controls the imaging unit 3 to capture a recording image of the subject (step S11). For example, the image capture control unit 6e sets a timer for automatically capturing the image of the subject after a predetermined time and, when the predetermined time set by the timer has elapsed, causes the imaging unit 3 to capture the image of the subject, and the signal processing unit 4 to generate the image data. The image processing unit 7 encodes the image data generated by the signal processing unit 4 in the predetermined compression format (e.g. JPEG), to generate the image data of the recording image.

The image recording unit 8 acquires the recording image from the image processing unit 7 as a privacy image P and also acquires the privacy level calculated in the privacy level calculation process, and records the image data of the privacy image P in association with the privacy level as Exif information (step S12).

This completes the automatic imaging process.

Although one privacy image P is captured based on the privacy level in the above-mentioned automatic imaging process, this is an example and does not limit the present invention. For instance, a plurality of privacy images P higher in privacy level than the predetermined determination value may be captured and recorded in the image recording unit 8 so that the user can select a desired privacy image P from the recorded privacy images P.

<Privacy Level Calculation Process>

Figure 3:
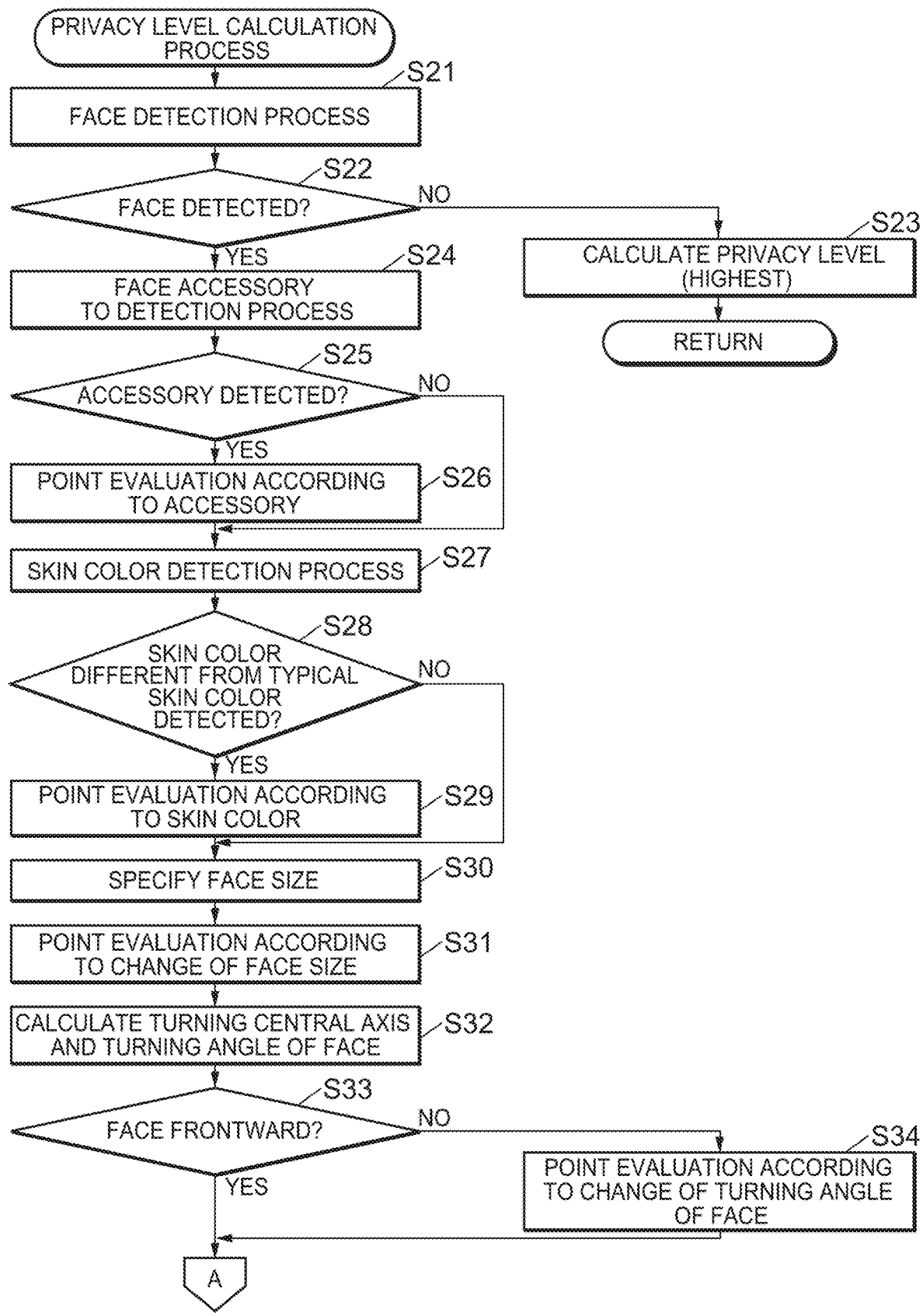
FIG. 3 is a flowchart illustrating an example of the operation relating to a privacy level calculation process by the image processing apparatus in FIG. 1.
Figure 4:
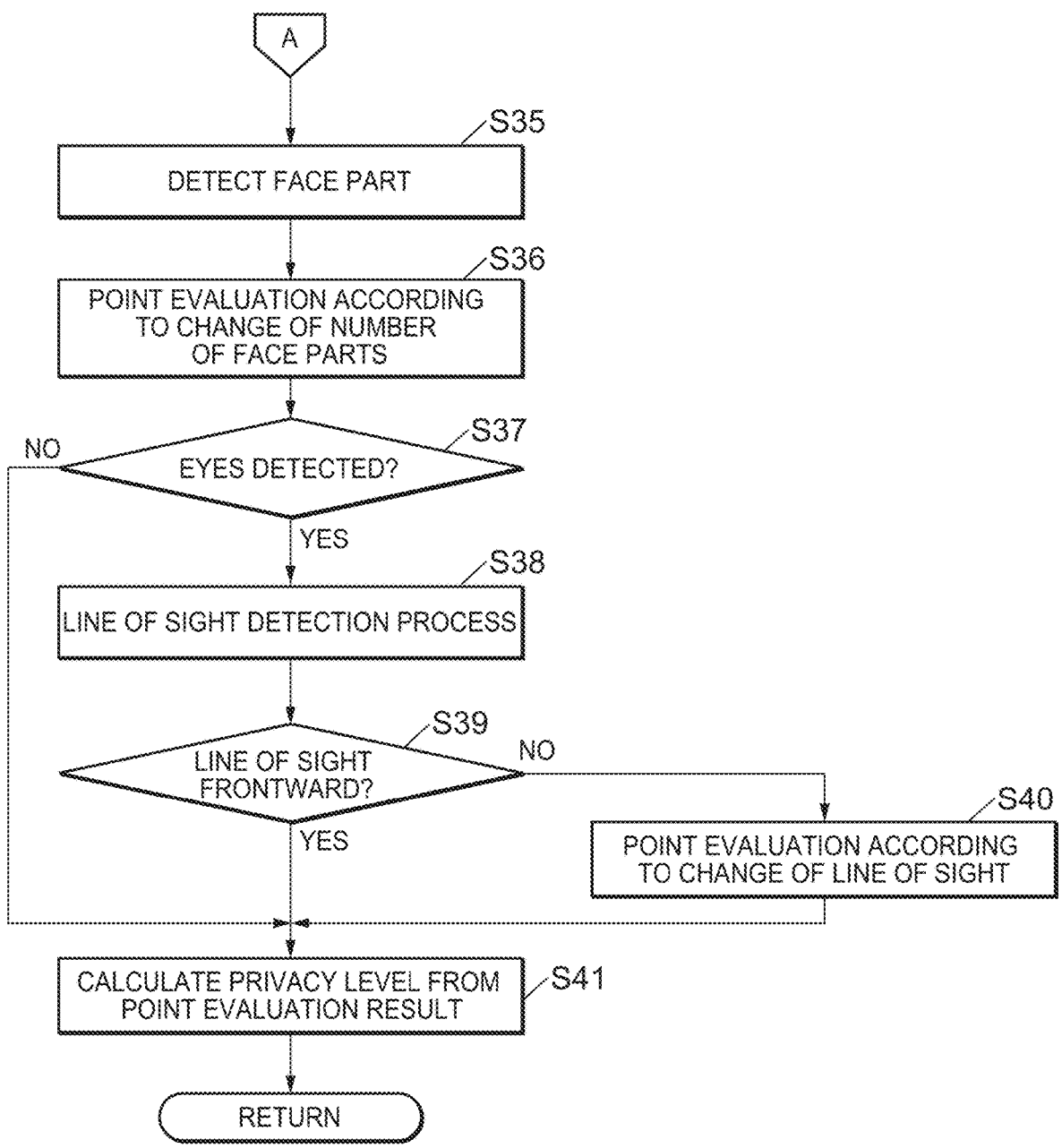
FIG. 4 is a flowchart illustrating the continuation of the privacy level calculation process in FIG. 3.

The following describes the privacy level calculation process by the image processing apparatus 100, with reference to FIGS. 3 and 4.

FIGS. 3 and 4 are flowcharts illustrating an example of the operation relating to the privacy level calculation process.

As illustrated in FIG. 3, the detection unit 6b first performs the face detection process on the frame image to be processed (e.g. the new frame image acquired in step S8 in FIG. 2) (step S21), and determines whether or not the face region containing the face of the person as the subject is detected (step S22).

In the case where the detection unit 6b determines that the person as the subject is within the frame image but the face region is not detected (step S22: NO), for example, the person may be facing rearward with the whole body turning approximately 180° about the yaw axis. The first calculation unit 6c accordingly calculates the privacy level to be highest (step S23). This completes the privacy level calculation process.

In the case where the detection unit 6b determines that the face region is detected in step S22 (step S22: YES), the first calculation unit 6c detects any accessory (external concealment) such as sunglasses or a mask from the face region detected from the frame image to be processed (step S24), and determines whether or not the accessory (external concealment) is detected (step S25). In the case where the first calculation unit 6c determines that the accessory (external concealment) is detected (step S25: YES), the first calculation unit 6c evaluates and determines the points for calculating the privacy level depending on the type of the accessory (external concealment), with reference to the concealment table ST (FIG. 9A) (step S26). In the case where the first calculation unit 6c determines that the accessory (external concealment) is not detected (step S25: NO), the first calculation unit 6c skips the process in step S26.

Next, the first calculation unit 6c measures the color of the skin color region in the face region detected from the frame image to be processed. The first calculation unit 6c also acquires the reference face image F from the memory 2, and measures the color of the skin color region in the face region detected from the reference face image F. The first calculation unit 6c performs the skin color detection process of calculating the difference between the measured skin colors (step S27), and determines whether or not any skin color different from a typical skin color, with the calculated skin color difference being the predetermined value or more, is detected (step S28). In the case where the first calculation unit 6c determines that the skin color different from the typical skin color is detected (step S28: YES), the first calculation unit 6c evaluates and determines the points for calculating the privacy level depending on the skin color (calculated skin color difference) (step S29). In the case where the first calculation unit 6c determines that the skin color different from the typical skin color is not detected (step S28: NO), the first calculation unit 6c skips the process in step S29.

Next, the first calculation unit 6c specifies the number of pixels constituting the face region detected from the frame image to be processed, as the size of the face (step S30). The first calculation unit 6c also acquires the reference face image F from the memory 2, and specifies the number of pixels constituting the face region of the person's face detected from the reference face image F.

The first calculation unit 6c specifies, from the change of the number of pixels constituting the face region, the change of the size of the person's face in the frame image with respect to the reference state, and evaluates and determines the points for calculating the privacy level depending on the specified change of the face size (step S31).

Next, the first calculation unit 6c compares the face detection frame shape corresponding to the face region of the person in the reference face image F and the face detection frame shape corresponding to the face region of the person in the new frame image, and calculates the turning central axis and turning angle of the person's face from the change of the face detection frame shape (step S32).

The first calculation unit 6c determines whether or not the person's face detected from the frame image to be processed is frontward (step S33).

In the case where the first calculation unit 6c determines that the face is not frontward in step S33 (step S33: NO), the first calculation unit 6c specifies the change quantity or change rate of the turning angle of the person's face about the predetermined axis with respect to the reference state, and evaluates and determines the points for calculating the privacy level depending on the specified change of the turning angle of the face (step S34).

In the case where the first calculation unit 6c determines that the face is frontward in step S33 (step S33: YES), the first calculation unit 6c skips the process in step S34.

Referring now to FIG. 4, the detection unit 6b detects one or more face parts such as the eyes and the mouth from the face region detected in the frame image to be processed in the face detection process (step S35). The detection unit 6b also detects one or more face parts such as the eyes and the mouth from the face region in the reference face image F.

The first calculation unit 6c evaluates and determines the points for calculating the privacy level depending on the change of the number of face parts, i.e. the change of the ratio at which the person's face part is hidden with respect to the reference state (step S36).

The detection unit 6b then determines whether or not the eyes (or one of the eyes) are detected from the frame image to be processed (step S37).

In the case where the detection unit 6b determines that the eyes (or one of the eyes) are detected (step S37: YES), the detection unit 6b performs the line of sight detection process on the frame image to be processed (step S38), and determines whether or not the line of sight of the person as the subject is frontward (step S39).

In the case where the detection unit 6b determines that the line of sight is not frontward in step S39 (step S39: NO), the first calculation unit 6c specifies the change of the line of sight of the person as the subject with respect to the reference state, and evaluates and determines the points for calculating the privacy level depending on the specified change of the person's line of sight (step S40).

In the case where the detection unit 6b determines that the line of sight is frontward in step S39 (step S39: YES), the first calculation unit 6c skips the process in step S40.

In the case where the detection unit 6b determines that the eyes (or one of the eyes) are not detected in step S37 (step S37: NO), the detection unit 6b and the first calculation unit 6c skip the processes in steps S38 to S40.

The first calculation unit 6c then calculates the privacy level using a predetermined conversion formula, based on the result of point evaluation depending on the accessory in step S26, the result of point evaluation depending on the skin color in step S29, the result of point evaluation depending on the change of the face size in step S31, the result of point evaluation depending on the change of the turning angle of the face in step S34, the result of point evaluation depending on the change of the ratio at which the face part is hidden in step S36, and/or the result of point evaluation depending on the change of the person's line of sight in step S40 (step S41). Here, the first calculation unit 6c calculates the privacy level that is lower when the change of the person in the frame image from the reference state is smaller and higher when the change of the person in the frame image from the reference state is greater.

The conversion formula for privacy level calculation is intended to comprehensively evaluate all evaluation items to calculate the privacy level. Alternatively, at least one evaluation item to be given priority (e.g. the face direction) may be designated and, if no point evaluation is made on this evaluation item, the privacy level may be calculated from the point evaluation results of other evaluation items.

This completes the privacy level calculation process.

<Manual Imaging Process>

Figure 5:
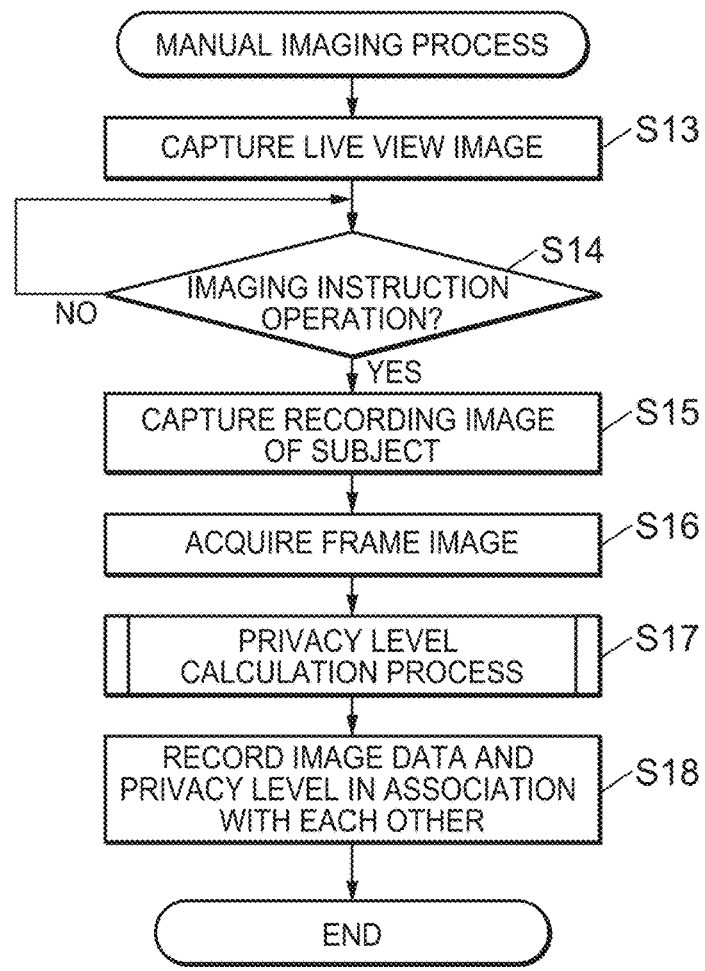
FIG. 5 is a flowchart illustrating an example of the operation relating to a manual imaging process by the image processing apparatus in FIG. 1.

The following describes the manual imaging process by the image processing apparatus 100, with reference to FIG. 5.

FIG. 5 is a flowchart illustrating an example of the operation relating to the manual imaging process.

As illustrated in FIG. 5, when the imaging unit 3 starts capturing the live view image of the subject, the signal processing unit 4 performs each type of image signal processing on the analog signal of each frame image of the live view image transferred from the electronic imaging unit 3b, to generate digital image data (step S13). The signal processing unit 4 outputs the generated image data to the memory 2, and the memory 2 temporarily stores the received image data.

Next, the central control unit 1 determines whether or not an imaging instruction by pressing the shutter button in the operation input unit 11 (imaging instruction operation) is made (step S14).

In the case where the central control unit 1 determines that the imaging instruction operation is made (step S14: YES), the image capture control unit 6e controls the imaging unit 3 to capture a recording image of the subject (step S15). For example, the image capture control unit 6e causes the imaging unit 3 to capture the image of the subject, and the signal processing unit 4 to generate the image data. The image processing unit 7 encodes the image data generated by the signal processing unit 4 in the predetermined compression format (e.g. JPEG), to generate the image data of the recording image.

The first image acquisition unit 6a in the operation control unit 6 reads and acquires image data of a frame image of the live view image temporarily stored in the memory 2 (step S16), and the operation control unit 6 performs the above-mentioned privacy level calculation process (see FIGS. 3 and 4) (step S17).

The image recording unit 8 acquires the recording image from the image processing unit 7 as a privacy image P and also acquires the privacy level calculated in the privacy level calculation process, and records the image data of the privacy image P in association with the privacy level as Exif information (step S18).

This completes the manual imaging process.

As described above, in the image processing apparatus 100 in Embodiment 1, a privacy level of a person's face included in a frame image (an example of the type of image) captured by the imaging unit 3 is calculated (an example of determining whether or not a privacy level indicating the level of difficulty in identifying a person's face as the face of a specific person satisfies a predetermined condition). In the case where the calculated privacy level is determined to be higher than a predetermined determination value, the imaging unit 3 is controlled to capture a recording image (privacy image P) (an example of control to execute a predetermined image-related process). This eliminates the need for image processing such as pixelization or masking for an image to be released or recorded, and enables the obtainment of a more natural privacy image P according to a desired privacy level without poor appearance caused by local pixelization or masking.

The recording image (privacy image P) captured based on the privacy level is then transmitted to a predetermined external apparatus such as the recording server S, as a result of which the image can be released on a webpage as content.

In Embodiment 1, the imaging unit 3 is controlled to capture a recording image (privacy image P) in the case where the calculated privacy level is determined to be higher than the predetermined determination value. Alternatively, while the imaging unit 3 normally captures a privacy image P, the imaging unit 3 is controlled not to capture a privacy image P (an example of control to execute a predetermined image-related process) in the case where the calculated privacy level is not determined to be higher than the predetermined determination value. This has the same effect as Embodiment 1.

Here, the privacy level is calculated for each of the frame images sequentially captured by the imaging unit 3, and whether or not the calculated privacy level is higher than the predetermined determination value is determined. The recording image is captured when the determination result changes from the state where the privacy level is not higher than the predetermined determination value to the state where the privacy level is higher than the predetermined determination value. For example, during the capture of the live view image, the user performs such an action that changes the privacy level so that the privacy level becomes higher than the predetermined determination value while adjusting the privacy level of each frame image. This enables the obtainment of an image according to a desired privacy level.

The privacy level can be calculated based on the relative change of the person's face or face part from the reference state where the person's face in the frame image is identifiable as the face of the specific person (e.g. the state where the person's face is detectable and the person's face and line of sight are in the predetermined direction). For example, the privacy level can be calculated based on the change quantity or change rate of the turning angle of the person's face about the predetermined axis or the change quantity or change rate of the orientation of the image processing apparatus 100 relative to the person's face. The use of the relative change of the person's face or face part from the reference state eliminates the need to, for example, set the turning angle of the face for each privacy level beforehand and turn the face to a preset angle or adjust the orientation of the image processing apparatus 100. This improves usability, and contributes to diverse expressions of the privacy image P acquired based on the privacy level.

The privacy level may also be calculated based on the change of the ratio at which the person's face or face part is hidden in the frame image, the change of the size of the person's face in the frame image or the imaging distance to the person's face, the change of the external concealment that hides the person's face or face part, and/or the change of the color of the person's face. The use of more evaluation items for privacy level calculation contributes to more diverse expressions of the privacy image P acquired based on the privacy level.

Moreover, each privacy image P is recorded in association with the corresponding privacy level. Hence, each privacy image P can be displayed on the display panel 9b according to the classification or order based on the associated privacy level. This eases the selection of a desired privacy image P by the user in the case where a plurality of privacy images P are recorded, and thus improves usability.

In the manual imaging process, a privacy level indicating the level of difficulty in identifying a person's face included in a frame image as the face of a specific person is calculated, and an image captured as a recording image in response to the user's imaging instruction is recorded in association with the calculated privacy level (an example of control to execute a predetermined image-related process). Hence, the recording image can be called and displayed together with the associated privacy level, and the recording image associated with the privacy level can be output to an external apparatus. The user references to the privacy level associated with the displayed recording image, or the external apparatus references to the privacy level associated with the output recording image (an example of determining whether or not a privacy level satisfies a predetermined condition). In the case where the privacy level is determined to be higher than a predetermined determination value, the user or the external apparatus may determine whether or not to release the image, or perform the release process.

Moreover, during review display in which the image captured in response to the user's imaging instruction is displayed for a predetermined time, the calculated privacy level is also displayed as an example of control to execute a predetermined image-related process. The user then determines whether or not to release or record the image. The captured image can thus be released or recorded in response to a predetermined operation during review display.

In the embodiment described above, the privacy level determination value may be set automatically.

Figure 11:
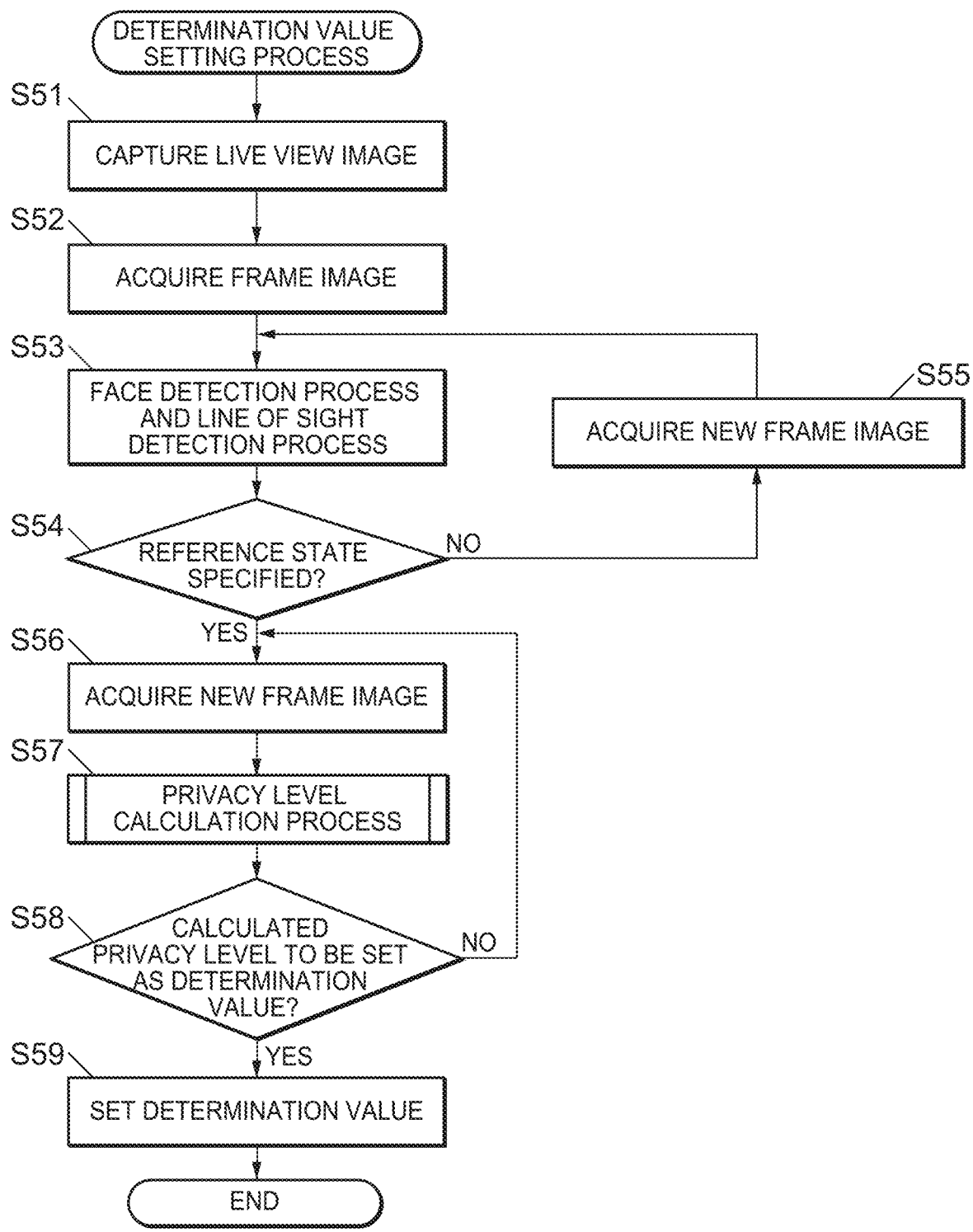
FIG. 11 is a flowchart illustrating an example of the operation relating to a determination value setting process by the image processing apparatus in FIG. 1.

The following describes the determination value setting process by the image processing apparatus 100, with reference to FIG. 11.

FIG. 11 is a flowchart illustrating an example of the operation relating to the determination value setting process.

The determination value setting process is performed before the above-mentioned automatic imaging process, in the state where the mode for setting the determination value used in the automatic imaging process is selected.

As illustrated in FIG. 11, when the imaging unit 3 starts capturing the live view image of the subject, the signal processing unit 4 performs each type of image signal processing on the analog signal of each frame image of the live view image transferred from the electronic imaging unit 3b, to generate digital image data (step S51). The signal processing unit 4 outputs the generated image data to the memory 2, and the memory 2 temporarily stores the received image data.

The first image acquisition unit 6a in the operation control unit 6 reads and acquires image data of a frame image of the live view image from the memory 2 (step S52).

The detection unit 6b performs, on the frame image acquired by the first image acquisition unit 6a, the face detection process to detect the face region containing the face of the person as the subject, and performs the line of sight detection process to detect the line of sight of the person as the subject (step S53).

The first calculation unit 6c determines whether or not the reference state where the person's face is detectable and the person's face and line of sight are frontward is specified, based on the results of the face detection process and line of sight detection process by the detection unit 6b (step S54).

In the case where the first calculation unit 6c determines that the reference state is not specified in step S54 (step S54: NO), the first image acquisition unit 6a reads and acquires image data of a new frame image of the live view image from the memory 2 (step S55). The process then returns to step S53. In step S53, the detection unit 6b performs the face detection process and the line of sight detection process on the new frame image acquired by the first image acquisition unit 6a substantially in the same manner as above (step S53).

In the case where the first calculation unit 6c determines that the reference state is specified in step S54 (step S54: YES), the first image acquisition unit 6a reads and acquires image data of a new frame image of the live view image from the memory 2 (step S56). The operation control unit 6 performs the privacy level calculation process (see FIGS. 3 and 4) for calculating the privacy level of the new frame image (step S57). The image data of the frame image in the reference state (the reference face image F) may be temporarily stored in the memory 2.

The operation control unit 6 determines whether or not to set the privacy level calculated in the privacy level calculation process as the determination value used for privacy level determination in the automatic imaging process (step S58). For example, the display control unit 9*a* causes the display panel 9*b* to display a confirmation screen (not illustrated) for the privacy level calculated in the privacy level calculation process. After the user confirms the privacy level, the operation control unit 6 determines whether or not the calculated privacy level is to be set as the determination value, depending on whether or not an instruction to use the calculated privacy level as the determination value is input based on a predetermined operation on the operation input unit 11.

In the case where the operation control unit 6 determines that the calculated privacy level is not to be set as the determination value (step S58: NO), the process returns to step S56, and the operation control unit 6 performs the subsequent processes. In detail, the first image acquisition unit 6*a* acquires image data of a new frame image in step S56, and the operation control unit 6 performs the privacy level calculation process in step S57.

In the case where the operation control unit 6 determines that the calculated privacy level is to be set as the determination value in step S58 (step S58: YES), the operation control unit 6 sets the calculated privacy level as the determination value (step S59). In detail, the first calculation unit 6*c* in the operation control unit 6 outputs the calculated privacy level to the memory 2, and the memory 2 temporarily stores the received privacy level as the determination value.

This completes the determination value setting process.

Embodiment 2

Figure 12:
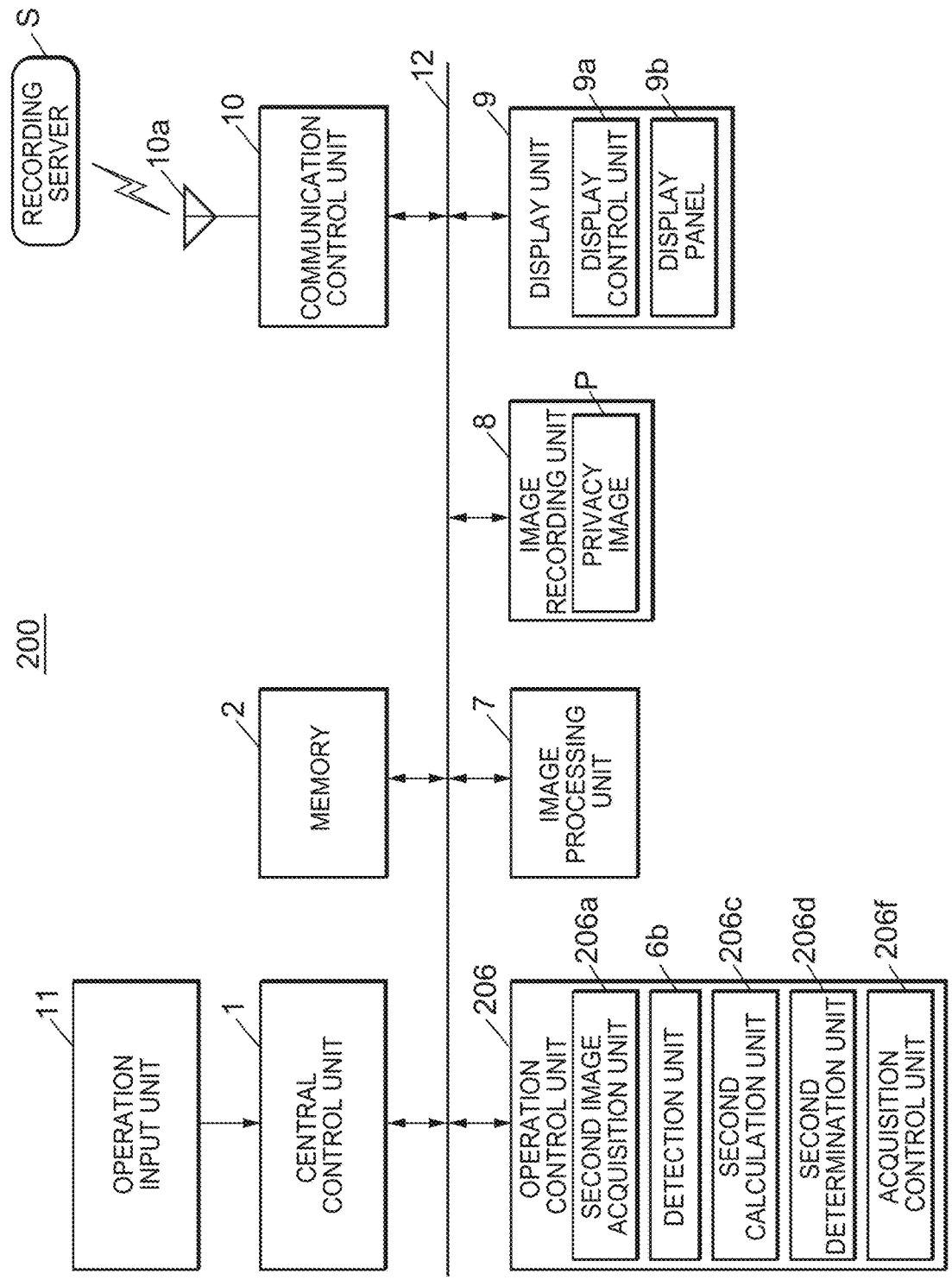
FIG. 12 is a block diagram illustrating the schematic structure of an image processing apparatus in Embodiment 2 to which the present invention is applied.

The following describes an image processing apparatus 200 in Embodiment 2, with reference to FIG. 12.

FIG. 12 is a block diagram illustrating the schematic structure of the image processing apparatus 200 in Embodiment 2 to which the present invention is applied.

As illustrated in FIG. 12, the image processing apparatus 200 in this embodiment includes the central control unit 1, the memory 2, an operation control unit 206, the image processing unit 7, the image recording unit 8, the display unit 9, the communication control unit 10, and the operation input unit 11.

The central control unit 1, the memory 2, the operation control unit 206, the image processing unit 7, the image recording unit 8, the display unit 9, and the communication control unit 10 are connected to each other via the bus line 12.

The image processing apparatus 200 in Embodiment 2 has substantially the same structure as the image processing apparatus 100 in Embodiment 1 except for the features described in detail below, and so its detailed description is omitted here.

The operation control unit 206 includes a second image acquisition unit 206*a*, the detection unit 6*b*, a second calculation unit 206*c*, a second determination unit 206*d*, and an acquisition control unit 206*f*.

The second image acquisition unit 206*a* acquires a recording image from the image recording unit 8.

For example, the second image acquisition unit 206*a* acquires a recording image recorded in the image recording unit 8, as an image to be processed in an image acquisition process (described later). In the case where a plurality of recording images are recorded in the image recording unit 8, all recording images may be processed in the image acquisition process, or only a recording image designated based on a predetermined operation on the operation input unit 11 by the user may be processed in the image acquisition process.

The second calculation unit (calculation means) 206*c* calculates a privacy level.

In detail, based on the detection result by the detection unit 6*b* for the recording image acquired by the second image acquisition unit 206*a*, the second calculation unit 206*c* sets the state where a person's face in the recording image is identifiable as the face of a specific person such as the state where the person's face is detectable and the person's face and line of sight are frontward (predetermined direction), as a virtual reference state. The second calculation unit 206*c* specifies the relative change of the person's whole face or face part from the virtual reference state, and calculates the privacy level.

In other words, for the recording image acquired by the second image acquisition unit 206*a*, the second calculation unit 206*c* assumes the state where the person's face and line of sight are frontward, as the virtual reference state. The second calculation unit 206*c* then specifies the virtual change of the turning angle of the person's whole face or face part detected from the recording image about a predetermined axis (e.g. the yaw axis or the pitch axis, see FIG. 6) with respect to the set virtual reference state. The second calculation unit 206*c* also specifies the virtual change of the person's line of sight detected from the recording image with respect to the set virtual reference state.

The second calculation unit 206*c* calculates the privacy level based on the specified virtual change of the turning angle of the person's face about the predetermined axis with respect to the virtual reference state and virtual change of the line of sight of the person as the subject with respect to the virtual reference state.

The second calculation unit 206*c* also calculates the privacy level based on the ratio at which the person's face or face part is hidden.

In detail, the second calculation unit 206*c* specifies the number of face parts (eyes, mouth, etc.) of the person detected from the recording image acquired by the second image acquisition unit 206*a*. The second calculation unit 206*c* calculates the privacy level based on, for example, the ratio at which the person's face part is hidden with respect to the number (for example, "3" in the case of both eyes and the mouth) of face parts that are supposed to be specified if the person as the subject does not perform the action of hiding the whole face or face part (eyes, mouth, etc.) by his or her hand or hair, an external concealment (sunglasses, mask, etc.), or the like.

The second calculation unit 206*c* also calculates the privacy level based on the size of the person's face in the recording image or the imaging distance to the person's face.

As an example, the second calculation unit 206*c* specifies the number of pixels constituting the face region that contains the person's face detected from the recording image acquired by the second image acquisition unit 206*a*, as the size of the person's face in the recording image. The second calculation unit 206*c* calculates the privacy level based on the specified size of the person's face in the recording image. As another example, the second calculation unit 206*c* acquires the focal length of the imaging unit 3 from the Exif information associated with the image data of the recording image, converts the focal length to the imaging distance to the person's face, and calculates the privacy level.

The second calculation unit 206c also calculates the privacy level based on the change of the external concealment with respect to the reference state.

In detail, the second calculation unit 206c compares the type of external concealment detected from the reference face image F and the type of external concealment detected from the recording image acquired by the second image acquisition unit 206a, and specifies the change of the external concealment with respect to the reference state. The second calculation unit 206c calculates the privacy level based on the specified change of the external concealment with respect to the reference state.

The specific method of privacy level calculation based on the change of the external concealment with respect to the reference state by the second calculation unit 206c is substantially the same as that by the first calculation unit 6c in Embodiment 1, and so its detailed description is omitted here.

The second calculation unit 206c also calculates the privacy level based on the change of the color of the person's face with respect to the reference state.

In detail, the second calculation unit 206c compares the color of the person's face detected from the reference face image F and the color of the person's face detected from the recording image acquired by the second image acquisition unit 206a, and specifies the change of the color of the person's face with respect to the reference state. The second calculation unit 206c calculates the privacy level based on the specified change of the color of the person's face with respect to the reference state.

The specific method of privacy level calculation based on the change of the color of the person's face with respect to the reference state by the second calculation unit 206c is substantially the same as that by the first calculation unit 6c in Embodiment 1, and so its detailed description is omitted here.

The second determination unit (determination means) 206d determines whether or not the privacy level calculated by the second calculation unit 206c is higher than a predetermined determination value.

The second determination unit 206d determines whether or not the privacy level calculated by the second calculation unit 206c for the recording image is higher than the determination value, in the image acquisition process. In detail, the second determination unit 206d acquires a desired privacy level stored in the memory 2 as the determination value, and determines whether or not the privacy level calculated by the second calculation unit 206c is higher than the determination value.

The acquisition control unit 206f acquires an image subjected to a predetermined process.

In detail, the acquisition control unit 206f acquires the recording image whose privacy level is determined to be higher than the determination value by the second determination unit 206d, as a privacy image P subjected to a predetermined process (e.g. transmission).

<Image Acquisition Process>

Figure 13:
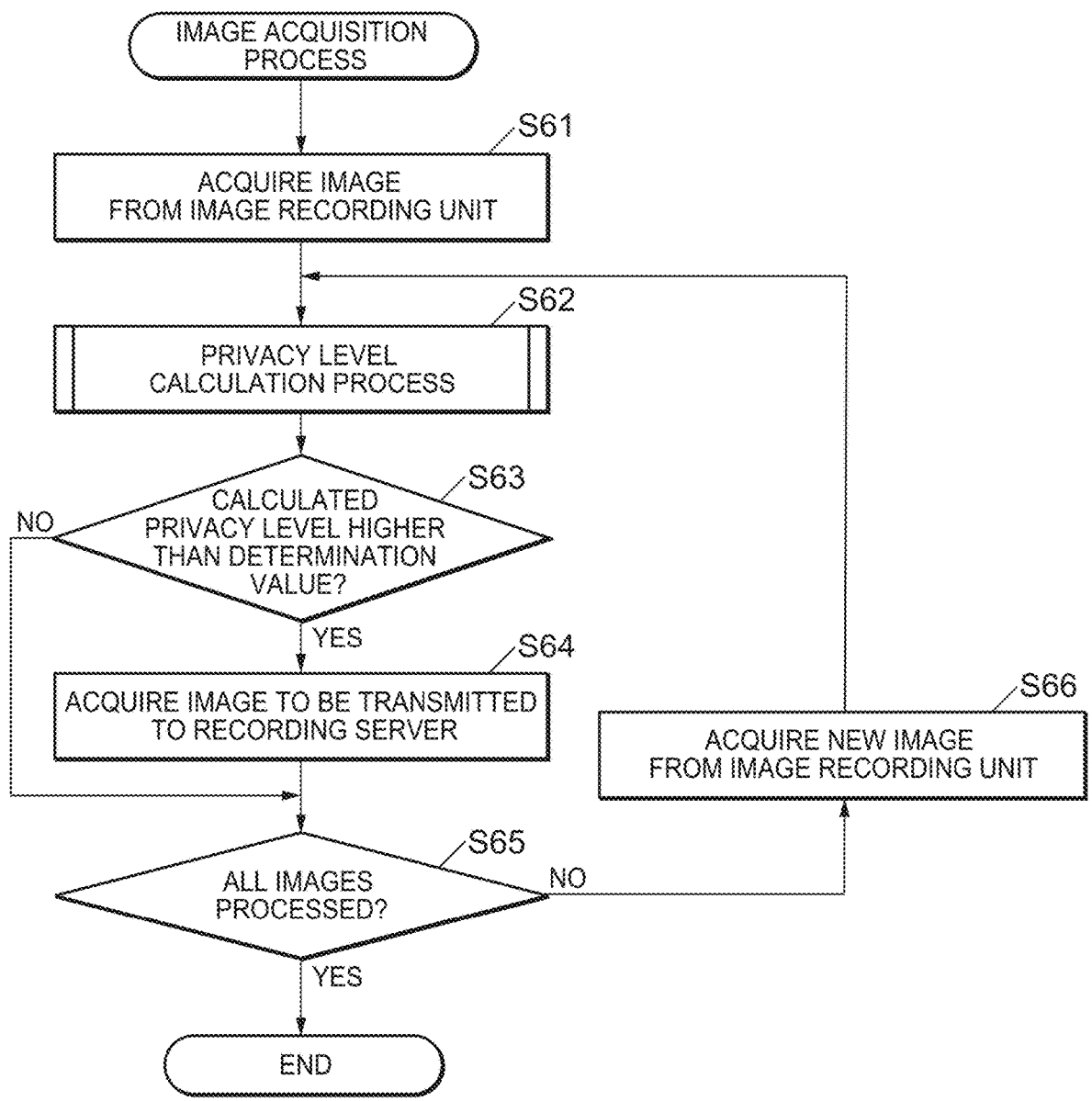
FIG. 13 is a flowchart illustrating an example of the operation relating to an image acquisition process by the image processing apparatus in FIG. 12.

The following describes the image acquisition process by the image processing apparatus 200, with reference to FIG. 13.

FIG. 13 is a flowchart illustrating an example of the operation relating to the image acquisition process.

As illustrated in FIG. 13, the second image acquisition unit 206a reads image data of any one recording image from the image recording unit 8, to acquire it as an image to be processed in the image acquisition process (step S61).

The operation control unit 206 performs the privacy level calculation process (see FIGS. 14 and 15) for calculating the privacy level of the acquired recording image (step S62, described in detail later).

The second determination unit 206d in the operation control unit 206 determines whether or not the privacy level calculated in the privacy level calculation process in step S62 is higher than the determination value (step S63). In detail, the second determination unit 206d reads and acquires the determination value from the memory 2, and determines whether or not the privacy level calculated in the privacy level calculation process is higher than the determination value.

In the case where the second determination unit 206d determines that the privacy level is higher than the determination value (step S63: YES), the acquisition control unit 206f acquires the recording image to be processed, as a privacy image P to be transmitted to the recording server S (step S64).

The operation control unit 206 then determines whether or not all recording images recorded in the image recording unit 8 have been processed in the image acquisition process (step S65).

In the case where the second determination unit 206d determines that the privacy level is not higher than the determination value in step S63 (step S63: NO), the operation control unit 206 skips the process in step S64, and equally determines whether or not all recording images recorded in the image recording unit 8 have been processed in the image acquisition process.

In the case where the operation control unit 206 determines that all recording images have not been processed in the image acquisition process in step S65 (step S65: NO), the second image acquisition unit 206a reads image data of a new recording image from the image recording unit 8, to acquire it as an image to be processed in the image acquisition process (step S66). The process then returns to step S62. In step S62, the operation control unit 206 performs the privacy level calculation process for calculating the privacy level of the acquired new recording image substantially in the same manner as above (step S62).

In the case where the operation control unit 206 determines that all recording images have been processed in the image acquisition process in step S65 (step S65: YES), the image acquisition process ends.

<Privacy Level Calculation Process>

Figure 14:
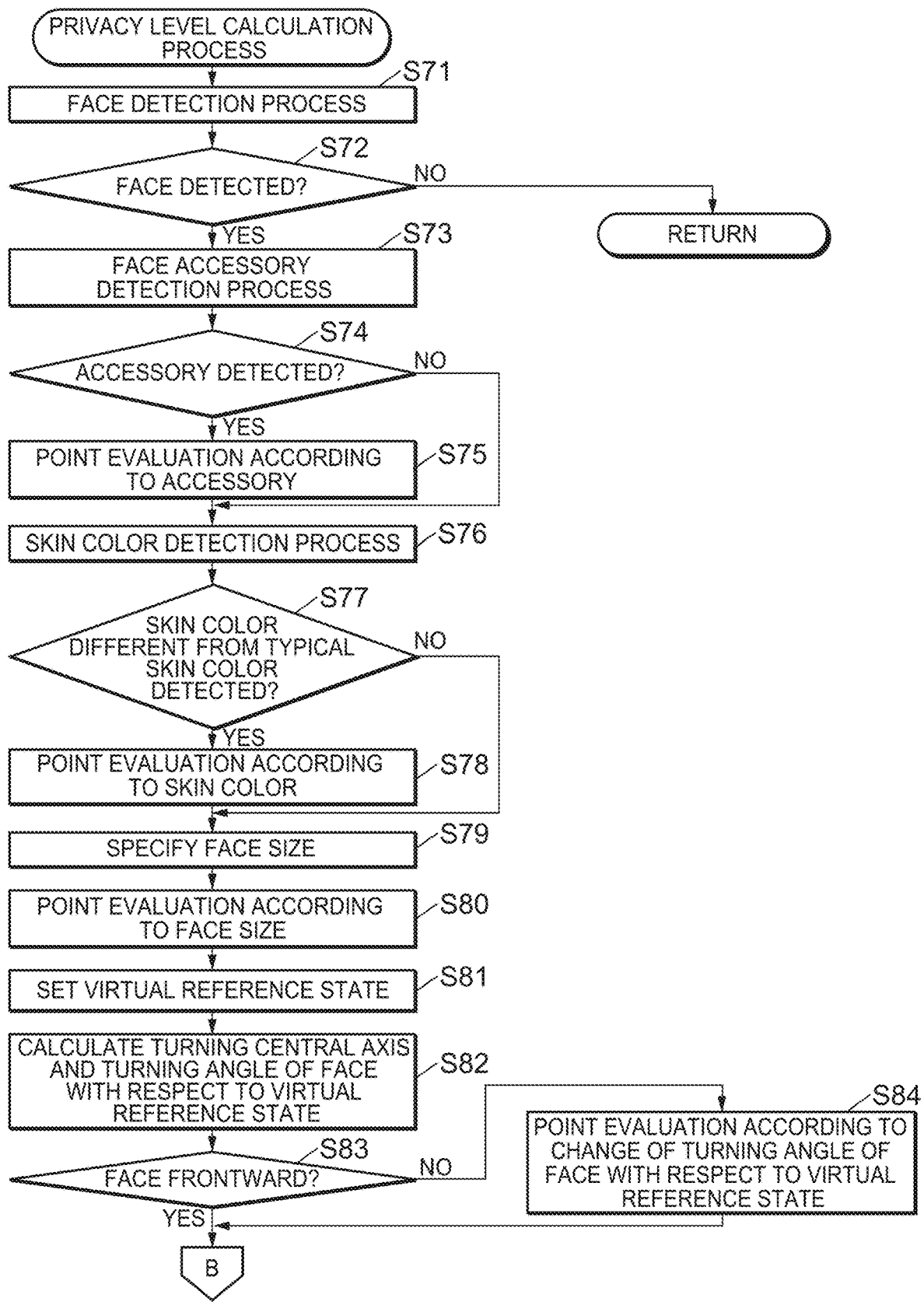
FIG. 14 is a flowchart illustrating an example of the operation relating to a privacy level calculation process by the image processing apparatus in FIG. 12.
Figure 15:
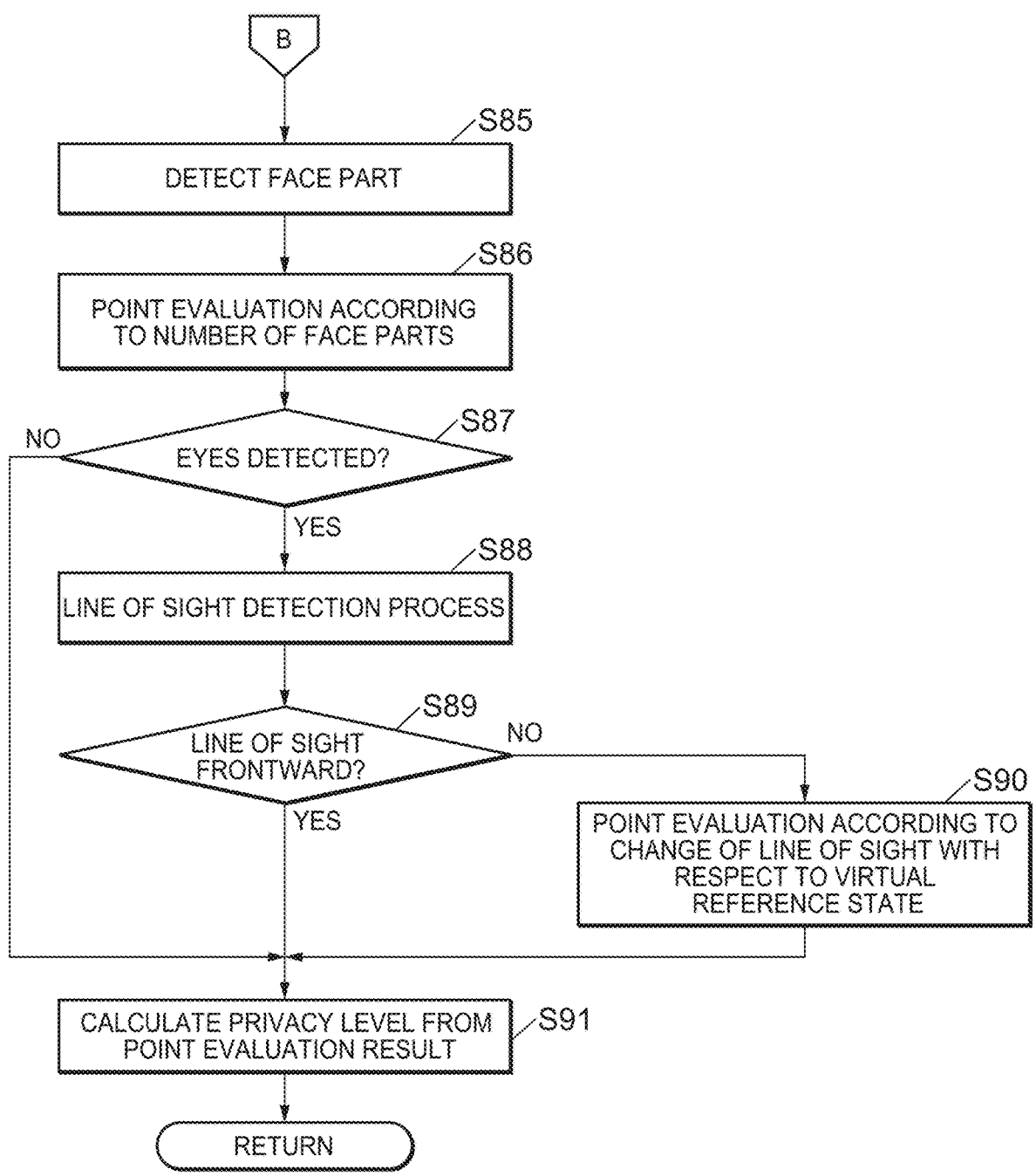
FIG. 15 is a flowchart illustrating the continuation of the privacy level calculation process in FIG. 14.

The following describes the privacy level calculation process by the image processing apparatus 200, with reference to FIGS. 14 and 15.

FIGS. 14 and 15 are flowcharts illustrating an example of the operation relating to the privacy level calculation process.

As illustrated in FIG. 14, the detection unit 6b first performs the face detection process on the recording image to be processed (e.g. the recording image acquired in step S61 in FIG. 13) (step S71), and determines whether or not the face region containing the person's face is detected (step S72).

In the case where the detection unit 6b determines that the face region is detected (step S72: YES), the second calculation unit 206c detects any accessory (external concealment) such as sunglasses or a mask from the face region detected from the recording image to be processed (step S73), and determines whether or not the accessory (external concealment) is detected (step S74). In the case where the second calculation unit 206c determines that the accessory (external concealment) is detected (step S74: YES), the second calculation unit 206c evaluates and determines the points for calculating the privacy level depending on the type of the accessory (external concealment), with reference to the concealment table ST (FIG. 9A) (step S75). In the case where the second calculation unit 206c determines that the accessory (external concealment) is not detected (step S74: NO), the second calculation unit 206c skips the process in step S75.

Next, the second calculation unit 206c measures the color of the skin color region in the face region detected from the recording image to be processed. The second calculation unit 206c also acquires the reference face image F from the memory 2, and measures the color of the skin color region in the face region detected from the reference face image F. The second calculation unit 206c performs the skin color detection process of calculating the difference between the measured skin colors (step S76), and determines whether or not any skin color different from a typical skin color, with the calculated skin color difference being the predetermined value or more, is detected (step S77). In the case where the second calculation unit 206c determines that the skin color different from the typical skin color is detected (step S77: YES), the second calculation unit 206c evaluates and determines the points for calculating the privacy level depending on the skin color (calculated skin color difference) (step 78). In the case where the second calculation unit 206c determines that the skin color different from the typical skin color is not detected (step S77: NO), the second calculation unit 206c skips the process in step S78.

Next, the second calculation unit 206c specifies the number of pixels constituting the face region detected from the recording image to be processed, as the size of the face (step S79). The second calculation unit 206c evaluates and determines the points for calculating the privacy level depending on the specified face size (step S80).

In the case where the detection unit 6b determines that the face region is not detected (step S72: NO), the privacy level calculation process ends.

The second calculation unit 206c sets the state where the person's face in the recording image is identifiable as the face of the specific person such as the state where the person's face is detectable and the person's face and line of sight are frontward (predetermined direction), as the virtual reference state (step S81). The second calculation unit 206c then calculates the turning central axis and turning angle of the detected person's face with respect to the set virtual reference state (step S82).

The second calculation unit 206c determines whether or not the person's face detected from the recording image to be processed is frontward (step S83).

In the case where the second calculation unit 206c determines that the face is not frontward in step S83 (step S83: NO), the second calculation unit 206c specifies the change quantity or change rate of the turning angle of the person's face about the predetermined axis with respect to the virtual reference state, and evaluates and determines the points for calculating the privacy level depending on the specified virtual change of the turning angle of the face (step S84).

In the case where the second calculation unit 206c determines that the face is frontward in step S83 (step S83: YES), the second calculation unit 206c skips the process in step S84.

Referring now to FIG. 15, the detection unit 6b detects one or more face parts such as the eyes and the mouth from the face region detected in the recording image to be processed in the face detection process (step S85). The second calculation unit 206c evaluates and determines the points for calculating the privacy level based on the number of detected face parts, that is, the ratio at which the person's face part is hidden with respect to the number (for example, "3" in the case of both eyes and the mouth) of face parts that are supposed to be specified if the person does not perform the action of hiding the whole face or face part (eyes, mouth, etc.) (step S86).

The detection unit 6b then determines whether or not the eyes (or one of the eyes) are detected from the recording image to be processed (step S87).

In the case where the detection unit 6b determines that the eyes (or one of the eyes) are detected (step S87: YES), the detection unit 6b performs the line of sight detection process on the recording image to be processed (step S88), and determines whether or not the line of sight of the person as the subject is frontward (step S89).

In the case where the detection unit 6b determines that the line of sight is not frontward in step S89 (step S89: NO), the second calculation unit 206c specifies the change of the line of sight of the person with respect to the virtual reference state, and evaluates and determines the points for calculating the privacy level depending on the specified virtual change of the person's line of sight (step S90).

In the case where the detection unit 6b determines that the line of sight is frontward in step S89 (step S89: YES), the second calculation unit 206c skips the process in step S90.

In the case where the detection unit 6b determines that the eyes (or one of the eyes) are not detected in step S87 (step S87: NO), the detection unit 6b and the second calculation unit 206c skip the processes in steps S88 to S90.

The second calculation unit 206c then calculates the privacy level based on the result of point evaluation depending on the accessory in step S75, the result of point evaluation depending on the skin color in step S78, the result of point evaluation depending on the face size in step S80, the result of point evaluation depending on the change of the turning angle of the face with respect to the virtual reference state in step S84, the result of point evaluation depending on the ratio at which the face part is hidden in step S86, and the result of point evaluation depending on the change of the person's line of sight with respect to the virtual reference state in step S90 (step S91).

This completes the privacy level calculation process.

As described above, in the image processing apparatus 200 in Embodiment 2, a privacy level of a person's face included in a recording image (an example of the type of image) is calculated (an example of determining whether or not a privacy level indicating the level of difficulty in identifying a person's face as the face of a specific person satisfies a predetermined condition). In the case where the calculated privacy level is determined to be higher than a predetermined determination value, the image is acquired as an image to be transmitted to a predetermined external apparatus (an example of control to execute a predetermined image-related process). This eliminates the need for image processing such as pixelization or masking for an image to be released or recorded, and enables the obtainment of a more natural privacy image P according to a desired privacy level without poor appearance caused by local pixelization or masking, as in the foregoing Embodiment 1.

The privacy level can be calculated based on the relative change of the person's face or face part from the virtual reference state where the person's face in the recording image is identifiable as the face of the specific person (e.g. the state where the person's face is detectable and the person's face and line of sight are in the predetermined direction). The use of the relative change of the person's face or face part from the virtual reference state improves usability, and contributes to diverse expressions of the privacy image P acquired based on the privacy level, substantially as in the foregoing Embodiment 1.

The privacy level may also be calculated based on the ratio at which the person's face or face part is hidden in the recording image, the size of the person's face in the recording image or the imaging distance to the person's face, the change of the external concealment that hides the person's face or face part, and/or the change of the color of the person's face. The use of more evaluation items for privacy level calculation contributes to more diverse expressions of the privacy image P acquired based on the privacy level.

Moreover, each privacy image P is recorded in association with the corresponding privacy level. Hence, each privacy image P can be displayed on the display panel 9b according to the classification or order based on the associated privacy level. This eases the selection of a desired privacy image P by the user in the case where a plurality of privacy images P are recorded, and thus improves usability.

The present invention is not limited to the foregoing Embodiments 1 and 2, and various modifications and design changes may be made without departing from the scope of the present invention.

For example, although the privacy image P is transmitted to the eternal recording server S and released in the foregoing Embodiments 1 and 2, this is an example and does not limit the present invention. For instance, the external server that releases the received privacy image P may only display the privacy image P without recording it, and delete the displayed privacy image P one by one. Moreover, the image processing apparatus 100 in Embodiment 1 or the image processing apparatus 200 in Embodiment 2 may have a server function so that an external terminal accesses the image processing apparatus 100 or 200 and views the privacy image P. In this case, for example, whether or not to release each privacy image P may be automatically set according to the associated privacy level.

In the foregoing Embodiments 1 and 2, the image data of each privacy image P may be recorded in association with the size of the person's face in the privacy image P as Exif information, so that the display control unit 9a displays each privacy image P recorded in the image recording unit 8 on the display panel 9b according to the classification or order based on the associated size of the person's face.

The structures of the image processing apparatuses 100 and 200 in Embodiments 1 and 2 are each an example and do not limit the present invention. For instance, although the image processing apparatus 100 includes the imaging unit 3, this is not a limitation. The image processing apparatus 100 may be connected to external imaging means so as to be capable of information communication and imaging control, without including imaging means.

Although the functions as the determination means and the control means are realized by the first determination unit 6d and the image capture control unit 6e under control of the central control unit 1 in Embodiment 1, this is not a limitation. The functions as the determination means and the control means may be realized by the central control unit 1 executing a predetermined program and the like.

In detail, a program including a determination process routine and a control process routine may be recorded in program memory (not illustrated). The determination process routine causes the CPU in the central control unit 1 to function as means for determining whether or not a privacy level indicating the level of difficulty in identifying a person's face included in an image as the face of a specific person satisfies a predetermined condition. The control process routine causes the CPU in the central control unit 1 to function as means for performing control to execute a predetermined process related to an image (privacy image P) in the case of determining that the privacy level satisfies the predetermined condition.

Likewise, although the functions as the calculation means and the control means are realized by the second calculation unit 206c and the acquisition control unit 206f under control of the central control unit 1 in Embodiment 2, this is not a limitation. The functions as the calculation means and the control means may be realized by the central control unit 1 executing a predetermined program and the like.

In detail, a program including a calculation process routine and a control process routine may be recorded in program memory (not illustrated). The calculation process routine causes the CPU in the central control unit 1 to function as means for calculating a privacy level indicating the level of difficulty in identifying a person's face included in an image as the face of a specific person. The control process routine causes the CPU in the central control unit 1 to function as means for performing control to execute a predetermined process related to an image (privacy image P) using the calculated privacy level.

Examples of a computer-readable medium storing such a program for executing each of the above-mentioned processes include not only ROM and a hard disk but also nonvolatile memory such as flash memory and a portable recording medium such as CD-ROM. Examples of a medium for providing program data via a predetermined communication line include a carrier wave.

While some embodiments of the present invention have been described above, the scope of the present invention is not limited to the foregoing embodiments, and includes the scope of the invention defined in the claims and its equivalent scope.

The invention claimed is:

1. An image processing apparatus comprising:
a processor configured to:
specify a reference state in which a person's face included in an image is identifiable as a face of a specific person, wherein the reference state is specific to the specific person, and differs depending on the specific person;
obtain a relative change of the person's face or face part from the specified reference state in another image;
calculate a privacy level of said another image, the privacy level indicating a level of difficulty in identifying the person's face as the face of the specific person, based on the obtained relative change, in said another image, of the person's face or face part from the specified reference state;
determine whether or not the calculated privacy level is higher than a predetermined determination value; and
perform control to execute a predetermined image-related process, according to a result of the determination.

2. The image processing apparatus according to claim 1, wherein the processor is configured to calculate the privacy level based on a change quantity or change rate, in said another image, of a turning angle of the person's face about a predetermined axis from a turning angle of the person's face in the specified reference state.

3. The image processing apparatus according to claim 1, wherein the processor is configured to specify, as the reference state, a state in which the person's face is detectable and the person's face and line of sight are in a predetermined direction, and to calculate the privacy level based on the relative change, in said another image, of the person's face or face part from the specified reference state.

4. The image processing apparatus according to claim 1, wherein said image and said another image are captured by an imaging unit, and wherein the processor is configured to calculate the privacy level based on a change quantity or change rate of an orientation of the imaging unit relative to the person's face at a time of capturing said another image, from an orientation of the imaging unit relative to the person's face at a time of capturing the image in which the reference state was specified.

5. The image processing apparatus according to claim 1, wherein the processor is configured to calculate the privacy level based on a change of a ratio at which the person's face or face part is hidden in said another image from a ratio at which the person's face or face part is hidden in the specified reference state.

6. The image processing apparatus according to claim 1, wherein the processor is configured to calculate the privacy level based on a change of a size of the person's face in said another image from a size of the person's face in the specified reference state, or a change of an imaging distance to the person's face in said another image from an imaging distance to the person's face in the specified reference state.

7. The image processing apparatus according to claim 1, wherein the processor is configured to calculate the privacy level based on a change of an external concealment that hides the person's face or face part in said another image, as compared to the specified reference state.

8. The image processing apparatus according to claim 1, wherein the processor is configured to calculate the privacy level based on a change of a color of the person's face in said another image from a color of the person's face in the specified reference state.

9. The image processing apparatus according to claim 1, wherein the processor is configured to:
control an imaging unit to capture said another image, and calculate the privacy level of said another image captured by the imaging unit; and
control the imaging unit to capture a recording image, in the case of determining that the calculated privacy level is higher than the predetermined determination value.

10. The image processing apparatus according to claim 9, wherein the processor is configured to:
calculate the privacy level for each of a plurality of images sequentially captured by the imaging unit;
determine sequentially whether or not the calculated privacy level is higher than the predetermined determination value; and
control sequentially the imaging unit to capture the recording image when a result of the determination changes from a state where the privacy level is not higher than the predetermined determination value to a state where the privacy level is higher than the predetermined determination value.

11. The image processing apparatus according to claim 9, wherein the processor is configured to:
record the captured recording image and the calculated privacy level in a memory in association with each other; and
control a display to display the image recorded in the memory, according to a classification or order based on the privacy level associated with the image.

12. The image processing apparatus according to claim 1, wherein the processor is configured to:
calculate the privacy level of said another image which is recorded in a memory; and
when the calculated privacy level of said another image is determined to be higher than the predetermined determination value, perform control to acquire said another image for which the calculated privacy level is determined to be higher than the predetermined determination value, as an image to be transmitted to a predetermined external apparatus.

13. An image processing apparatus comprising:
a processor configured to:
calculate a privacy level indicating a level of difficulty in identifying a person's face as a face of a specific person included in an image, based on an action of the person themselves as depicted in the image;
determine whether or not the calculated privacy level is higher than a predetermined determination value; and
perform control to execute a predetermined image-related process according to a result of the determination,
wherein the processor is configured to calculate the privacy level based on at least any of actions of the person turning their face away from a frontward direction, and covering their face with their hands.

14. An image processing method using an image processing apparatus, the image processing method comprising:
specifying a reference state in which a person's face included in an image is identifiable as a face of a specific person, wherein the reference state is specific to the specific person, and differs depending on the specific person;
obtain a relative change of the person's face or face part from the specified reference state in another image;
calculating a privacy level of said another image, the privacy level indicating a level of difficulty in identifying the person's face as the face of the specific person, based on the obtained relative change, in said another image, of the person's face or face part from the specified reference state;
determining whether or not the calculated privacy level is higher than a predetermined determination value; and
performing control to execute a predetermined image-related process, according to a result of the determination.

15. An image processing method using an image processing apparatus, the image processing method comprising:
calculating a privacy level indicating a level of difficulty in identifying a person's face as a face of a specific person included in an image, based on an action of the person themselves as depicted in the image;
determining whether or not the calculated privacy level is higher than a predetermined determination value; and
performing control to execute a predetermined image-related process according to a result of the determination,
wherein the privacy level is calculated based on at least any of actions of the person turning their face away from a frontward direction, and covering their face with their hands.

16. The image processing apparatus according to claim 13, wherein the processor is configured to:
specify a reference state in which a person's face is identifiable as a face of a specific person, wherein the reference state is specific to the specific person, and differs depending on the specific person; and calculate the privacy level based on a relative change of the person's face or face part in the image, from the specified reference state, based on the person's own action.

17. The image processing apparatus according to claim 13, wherein the processor is configured to:

control an imaging unit to capture the image, calculate the privacy level of the image captured by the imaging unit; and control the imaging unit to capture a recording image, in the case of determining that the calculated privacy level is higher than the predetermined determination value.

18. The image processing apparatus according to claim 17, wherein the processor is configured to control a memory to record the calculated privacy level in association with the recording image captured by the imaging unit.

* * * * *